United States Patent

Su et al.

[11] Patent Number: 6,103,148
[45] Date of Patent: *Aug. 15, 2000

[54] METHOD FOR CURING A LENS-FORMING FLUID

[75] Inventors: Kai C. Su; Jack C. White, both of Alpharetta, Ga.

[73] Assignee: Technology Resources International Corporation, Alpharetta, Ga.

[ * ] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 09/026,222

[22] Filed: Feb. 19, 1998

[51] Int. Cl.$^7$ .................................................. B29D 11/00
[52] U.S. Cl. ............................ 264/1.38; 264/2.2; 264/2.5; 264/40.4; 425/140; 425/352; 425/808
[58] Field of Search .................................. 264/1.36, 1.38, 264/2.2, 2.3, 1.1, 40.4, 2.5; 425/808, 140, 352

[56] References Cited

U.S. PATENT DOCUMENTS

| | | |
|---|---|---|
| 2,138,144 | 11/1938 | Dodge . |
| 2,406,361 | 8/1946 | Fairbank et al. . |
| 2,443,826 | 6/1948 | Johnson . |
| 2,745,138 | 5/1956 | Beattie . |
| 2,890,486 | 6/1959 | Crandon . |
| 2,964,501 | 12/1960 | Sarofeen . |
| 3,056,116 | 10/1962 | Weinberg . |
| 3,070,846 | 1/1963 | Schrier . |
| 3,136,000 | 6/1964 | Slyk . |
| 3,211,811 | 10/1965 | Lanman . |
| 3,297,422 | 1/1967 | Emerson et al. . |
| 3,337,659 | 8/1967 | Grandperret . |
| 3,538,583 | 11/1970 | Galockin et al. . |
| 3,553,815 | 1/1971 | McElvy . |
| 3,555,611 | 1/1971 | Reiterman . |
| 3,894,710 | 7/1975 | Sarofeen ................................. 249/117 |
| 3,902,693 | 9/1975 | Crandon et al. ......................... 249/134 |
| 3,938,775 | 2/1976 | Sarofeen ................................. 249/102 |
| 3,940,304 | 2/1976 | Schuler .................................... 156/245 |
| 3,946,982 | 3/1976 | Calkins et al. .......................... 249/102 |
| 3,970,362 | 7/1976 | Laliberte . |
| 4,085,919 | 4/1978 | Sulllivan ................................ 249/134 |
| 4,095,772 | 6/1978 | Weber ....................................... 249/82 |
| 4,103,901 | 8/1978 | Ditcher . |
| 4,136,727 | 1/1979 | Vogt . |
| 4,166,088 | 8/1979 | Neefe . |
| 4,227,673 | 10/1980 | Goodwin et al. ....................... 249/117 |
| 4,251,474 | 2/1981 | Blandin ................................... 264/1.1 |
| 4,257,988 | 3/1981 | Matos et al. ............................ 264/1.1 |
| 4,279,401 | 7/1981 | Ramirez et al. ........................ 249/139 |

(List continued on next page.)

OTHER PUBLICATIONS

Sales Brochure for Movemaster RV–MS Micro Robot System (Undated).

Ophthalmic Optic Files, Sections 1 through 6, produced by Essilor (Undated).

*Primary Examiner*—Mathieu D. Vargot
*Attorney, Agent, or Firm*—Needle & Rosenberg, P.C.

[57] ABSTRACT

A method for curing a lens-forming fluid, including exposing the lens-forming fluid to an ultra-violet light, wherein the exposure time is between twenty seconds and thirty minutes, which can completely cure the fluid. The exposure can occur by placing the lens-forming fluid intermediate a plurality of ultraviolet light sources, in which the intensity of the ultraviolet light is at least $1.2 \times 10^{-2}$ watts per square centimeter at a wavelength of 350 nanometers. The lens-forming fluid preferably is a monomer. The prior art, in contrast, requires significantly longer exposure times to cure monomer or other lens-forming fluids.

14 Claims, 9 Drawing Sheets

U.S. PATENT DOCUMENTS

| | | | |
|---|---|---|---|
| 4,497,754 | 2/1985 | Padoan . | |
| 4,522,768 | 6/1985 | Roscrow et al. | 264/2.2 |
| 4,569,807 | 2/1986 | Boudet | 264/2.2 |
| 4,573,903 | 3/1986 | Boudet et al. | 425/555 |
| 4,677,872 | 7/1987 | Nishida et al. | 74/551.9 |
| 4,693,446 | 9/1987 | Orlosky | 249/53 R |
| 4,728,469 | 3/1988 | Danner et al. . | |
| 4,750,525 | 6/1988 | Vaughan | 138/89 |
| 4,786,444 | 11/1988 | Hwang | 264/1.4 |
| 4,836,960 | 6/1989 | Spector et al. | 264/2.2 |
| 4,874,561 | 10/1989 | Spector | 264/1.1 |
| 4,879,318 | 11/1989 | Lipscomb et al. | 522/42 |
| 4,919,850 | 4/1990 | Blum et al. . | |
| 4,944,899 | 7/1990 | Morland et al. | 264/1.4 |
| 5,028,358 | 7/1991 | Blum . | |
| 5,052,916 | 10/1991 | Düllings et al. | 425/564 |
| 5,100,590 | 3/1992 | Ruhlin | 264/2.7 |
| 5,110,514 | 5/1992 | Soane . | |
| 5,114,632 | 5/1992 | Soane . | |
| 5,137,441 | 8/1992 | Fogarty | 425/412 |
| 5,154,861 | 10/1992 | McBrierty et al. | 264/1.38 |
| 5,160,749 | 11/1992 | Fogarty | 425/412 |
| 5,213,825 | 5/1993 | Shimizu et al. | 425/595 |
| 5,232,637 | 8/1993 | Dasher et al. | 264/1.3 |
| 5,288,221 | 2/1994 | Stoerr et al. | 425/125 |
| 5,364,256 | 11/1994 | Lipscomb et al. | 425/174.4 |
| 5,372,755 | 12/1994 | Stoerr et al. | 264/1.27 |
| 5,405,557 | 4/1995 | Kingsbury | 264/1.7 |
| 5,415,816 | 5/1995 | Buazza et al. | 264/1.38 |
| 5,415,817 | 5/1995 | Shiao et al. | 264/2.2 |
| 5,422,046 | 6/1995 | Tarshiani et al. | 264/1.38 |
| 5,458,820 | 10/1995 | Lefebvre | 264/1.7 |
| 5,512,221 | 4/1996 | Maus et al. | 264/2.5 |
| 5,516,468 | 5/1996 | Lipscomb et al. | 264/1.38 |
| 5,529,728 | 6/1996 | Buazza et al. | 264/1.38 |
| 5,574,554 | 11/1996 | Su et al. | 356/124 |
| 5,597,519 | 1/1997 | Martin et al. | 264/1.38 |
| 5,605,656 | 2/1997 | Sasano | 264/1.1 |
| 5,611,969 | 3/1997 | Cano et al. | 264/2.5 |
| 5,658,602 | 8/1997 | Martin et al. | 425/346 |
| 5,662,839 | 9/1997 | Magne | 264/1.38 |
| 5,693,268 | 12/1997 | Widman et al. | 264/1.1 |
| 5,744,357 | 4/1998 | Wang et al. | 425/347 |
| 5,804,107 | 9/1998 | Martin et al. | 264/1.36 |
| 5,882,698 | 3/1999 | Su et al. | 425/215 |
| 5,914,074 | 6/1999 | Martin et al. | 264/1.38 |
| 5,916,494 | 6/1999 | Widman et al. | 264/1.1 |
| 5,981,618 | 11/1999 | Martin et al. | 523/106 |

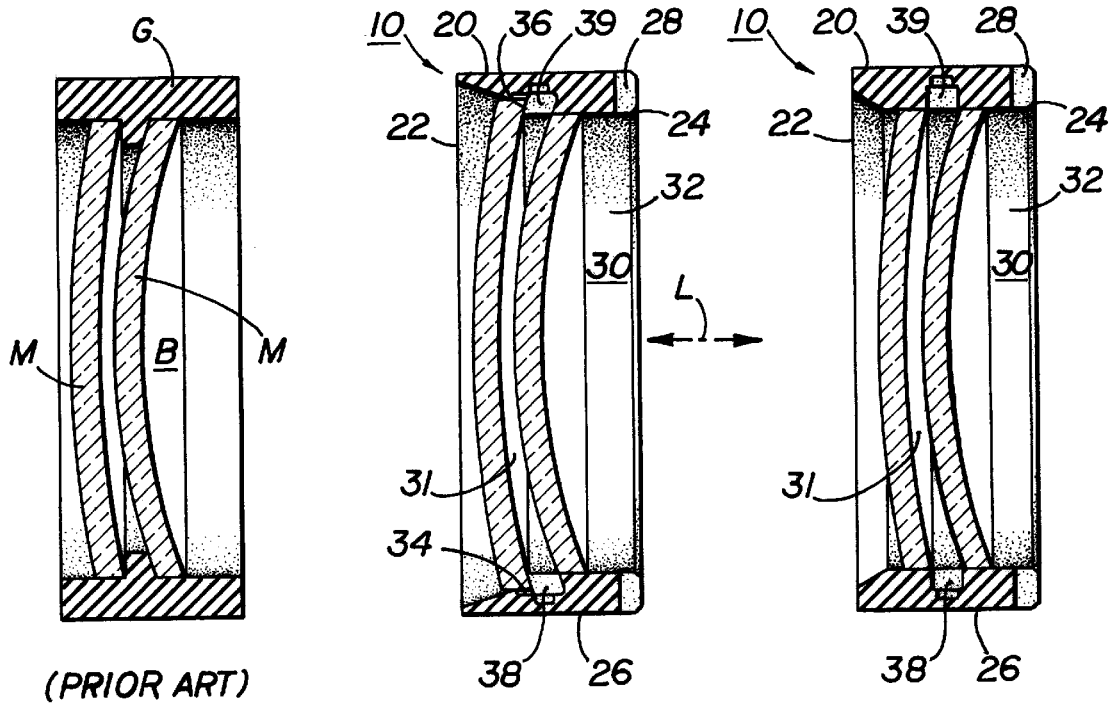
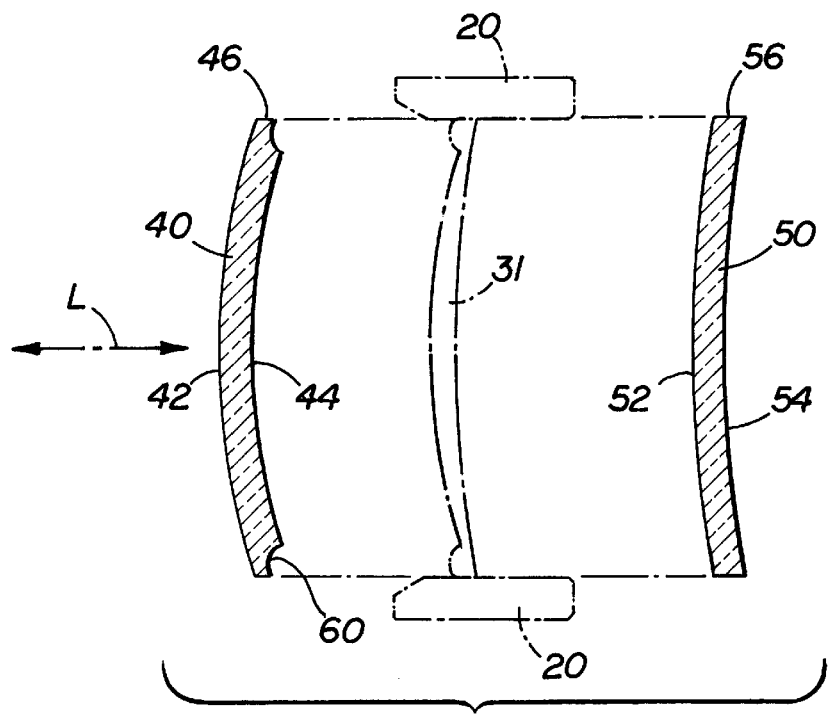

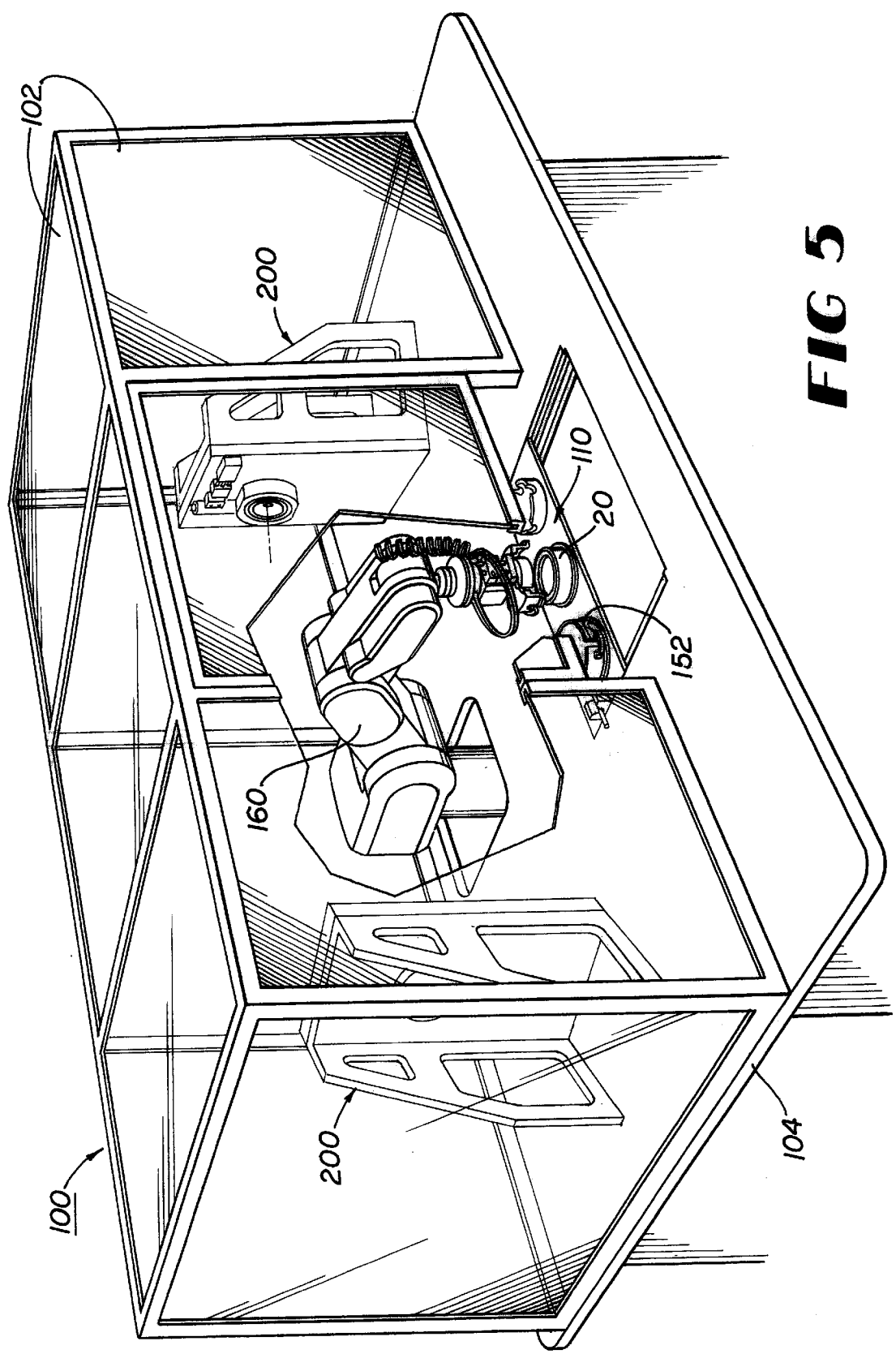

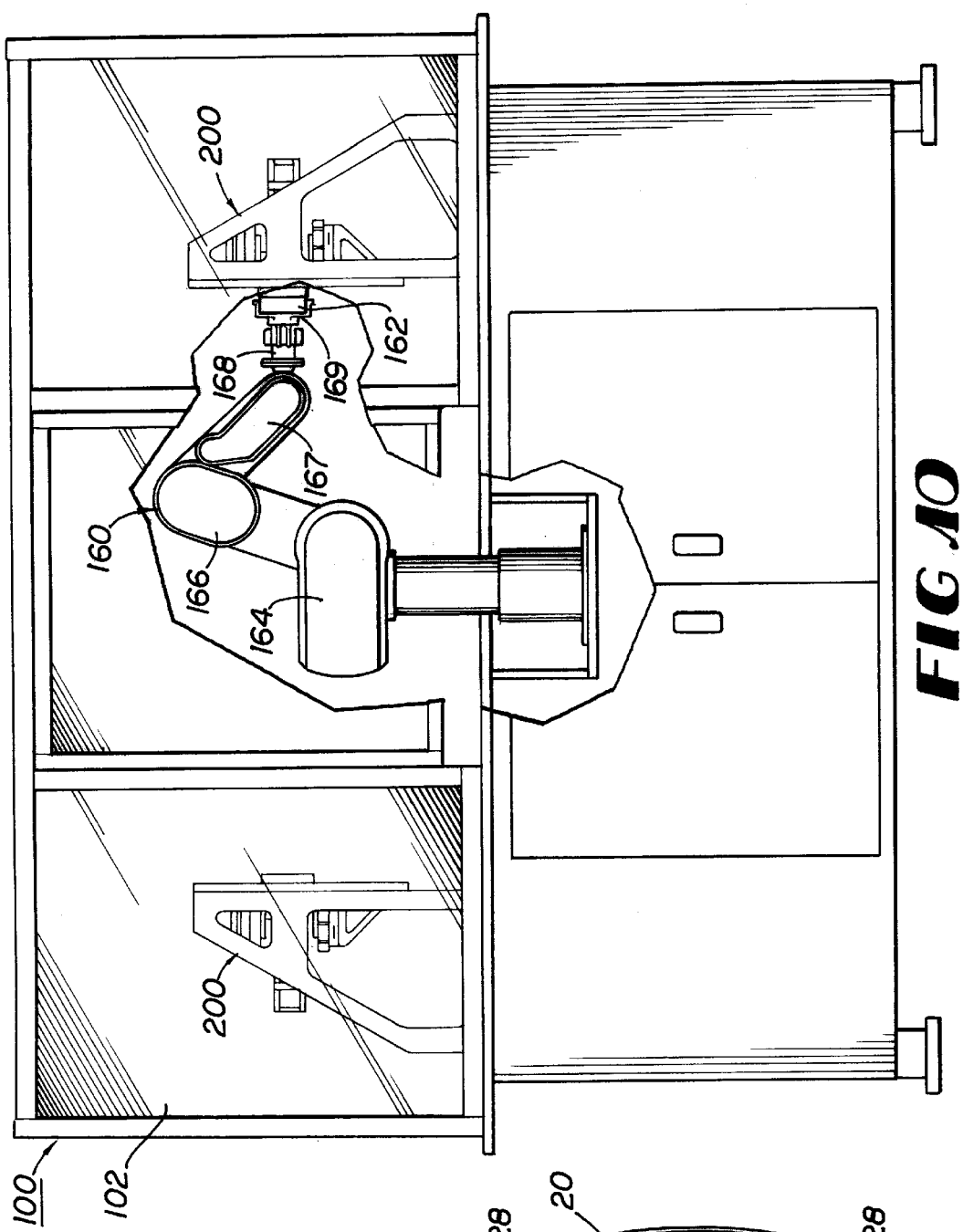
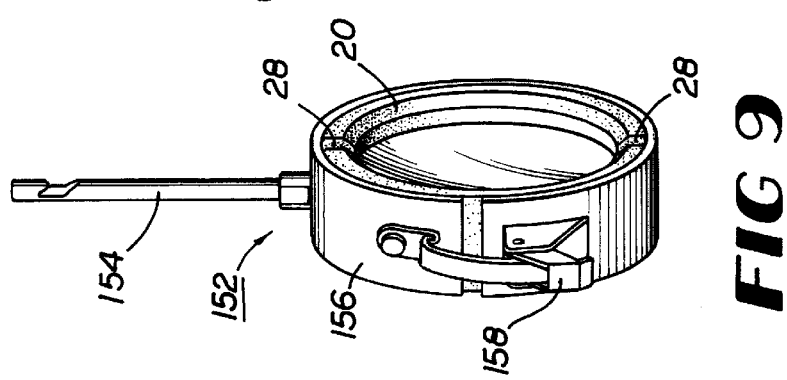
FIG 10
FIG 9

METHOD FOR CURING A LENS-FORMING FLUID

BACKGROUND OF THE INVENTION

1. Field of the Invention

The present invention comprises an apparatus and method for lens casting and a gasket therefor. The present invention also encompasses a method for curing the casted lens and an apparatus and method for separating the cured lens from the molds used to form the lens.

2. Background Art

Glasses or spectacles must correspond to a person's prescription as well as to the person's morphological and psychological characteristics. The ophthalmic lenses for glasses are made of a transparent material, usually glass or plastic, and are of a size and shape to produce desired effects, namely, focusing the light for the person's eye to see clearly.

The lenses use a well-defined geometrical configuration which determines the their optical properties. The shape of each lens is characterized by three attributes: (1) the curvature of its two surfaces; (2) the thickness at its center and edges; and (3) its diameter. The two surfaces of a lens can use various geometric configurations, including the following shapes: spherical; cylindrical; toric; piano; aspheric (usually elliptical); and progressive. For example, the surface of a lens can have a constant radius along its different axes so that the surface is symmetrical, which is known as a spherical surface. The spherical lens surface mirrors the shape of a portion of a sphere in which all meridians have the same radius of curvature. The spherical surface may be either convex or concave.

Alternatively, the surface of the lens can have two axes, each having a different radius of curvature, so that the surface of the lens is asymmetrical. An astigmatic surface is an example of such an asymmetrical surface and is characterized by its two principal meridians having a different radius of curvature from each other. The meridian having the greatest radius of curvature is called the "axis," and the other meridian having the smaller radius is called the "perpendicular axis." Astigmatic lens surfaces predominantly include a cylindrical surface and a toric surface. A plano surface and aspheric surface are examples of other lens surfaces used in the art.

For the cylindrical surface, the principal meridians along the axis has an infinite radius of curvature, e.g., flat or straight, and the perpendicular axis has a radius of curvature which is the same as the circular radius of a cylinder. Thus, a concave cylindrical surface is shaped to complementarily receive a cylinder on the surface and a convex surface resembles the exterior surface of such a cylinder.

The toric surface resembles the lateral surface of a torus, e.g., shaped as the inner tube of a tire. Thus, a torus surface is similar to a cylindrical surface, but the longitudinal axis curves instead of being straight as for a cylindrical surface. The perpendicular axis or meridian on the toric surface has a radius of curvature smaller than the radius of the axis. As with a spherical and a cylindrical surface, a toric surfaces can be convex by having the shape of the exterior surface of a torus or, alternatively, may be concave by having the shape of the inner surface of a torus.

An astigmatic surface is used for a person with an ocular astigmatism, in which the cornea is elliptical instead of round. The orientation of the elongated portion of an astigmatic cornea varies from person to person. For example, one person may have an axis at five degrees, another at thirty degrees, and another at yet a different orientation. The axis of the surface of the lens must be oriented to align with the orientation of the elongated portion of the cornea.

Different lens surfaces can be used in combination. Often, the front surface of a lens is spherical and the back surface is spherical, cylindrical, or toric. The front surface can alternatively be a plano surface. The optimum combination of surfaces in a lens is determined by the optical properties, the proposed use, and the appearance of the lens.

In addition to shape, thickness is also an important characteristic of a lens. The glass or plastic used to form the lens is a factor in establishing the thickness. Many lens today are made from plastic because of its light weight, density, refractive index, and impact resistance. Examples of plastics used for lenses include methyl-methacrylate (a thermoplastic resin, which is better known by its trademark "Plexiglas"® or "Perspex"®) and dandiallyl glycol carbonate, which is also known as CR39.

CR39 is the most popular lens material used today, in part, because all lens types used in ophthalmic optics can be made from it. CR39 is a petroleum derivative of the polyester group, a family of polymerisable thermosetting resins. In production, a monomer is first obtained from CR39. The monomer, which is a limpid liquid with the viscosity of glycerine oil, remains in a liquid state in cold storage, but hardens after several months at room temperature. To form a lens, the liquid monomer is placed and contained in a volume defined by two molds and a gasket. Once the monomer is in the volume, the monomer is cured to form a hardened polymeric lens taking the shape of the molds.

The glass molds used to form polymeric lenses are important in CR39 lens manufacturing. Not only do the molds form the correct shape to the lens according to the optical characteristics required, but the surface qualities of the finished lens depends on the accuracy of the molds since the lens surfaces are a precise reproduction of the inner mold surfaces. Accordingly, the mold surfaces are prepared with extreme precision and, after manufacture, are heat toughened to withstand the strain of the polymerization process.

An add power front mold, which forms a bifocal or trifocal portion to the lens, can also be used in forming lenses. The add power mold includes a segment curve, which is a concave depression cut into the concave half of the mold, to form the add power segment on the front surface of the lens. This segment curve produces a convex surface for the distance portion, together with a steeper convex surface for the reading add power segment.

The liquid monomer, as mentioned above, is placed into a volume defined by two molds and a gasket to form a lens. As shown in cross-section in FIG. 1, the prior art gaskets are known as T-gaskets G, which have a bore B and two ends that each complementarily receives a respective mold M. Different T-gaskets G are required to form varying power lenses because each T-gasket G sets a predetermined axial separation between molds M. That is, one T-gasket G sets the molds farther apart to form a lens of a greater power compared with another T-gasket G used to form a lower power lens. Accordingly, manufacturers must maintain separate T-gaskets for a +2 lens, another for a −3 lens, another for a −4 lens, etc.

One skilled in the art will also appreciate that forming an astigmatic surface in a T-gasket G requires that the ends of the gasket have the same shape as the inner surface of the mold M. For example, if the rear mold M forms a concave toric surface, then one end of the T-gasket G must have a complementary convex design to receive the mold M without leaking. And, different T-gaskets G must exist for each lens power using that mold shape.

Two manufacturing processes are used in making the lenses: direct polymerization and polymerization of a semi-finished lens. For the direct polymerization process, the top mold is removed and a nozzle directed into the mold cavity to fill the volume with monomer. The operator then positions the top mold to be aligned with the T-gasket so that excess monomer is squeezed out and air bubbles removed. The volume defined by the two polished molds and the gasket forms the shape of the lens when cured. The drawbacks of this prior art system include the handling, resulting mess, and wasted monomer. Also, some bubbles can still remain in the volume, which can ruin the formed lens. Additionally, this process is labor intensive and, accordingly, often performed in countries with an inexpensive labor pool.

To cure the monomer after the top mold is secured on the T-gasket, the filled gasket assemblies are stored in racks and put into an oven for fourteen to sixteen hours to undergo a controlled temperature cycle that provides the correct degree of polymerization. After this lengthy curing process is completed, the gasket assembly is removed and the lens is removed from between the molds. The lenses made using the direct polymerization process require a few finishing actions, such as edge trimming, annealing to eliminate casting stress, visual checks to eliminate lenses which might have defects, and lens power checking with a focimeter. Once the lens is finished, it is packed for shipping to a retail vendor or mounted in glasses for a consumer.

The second process, polymerization of a semi-finished lens, produces a lens known as a "semi." Unlike the direct polymerization lens, a semi lens has a concave, unfinished side that is surfaced after the curing process is completed. Thus, instead of forming the lens to be mounted into glasses with few finishing actions, the semi lens only has a single finished surface formed by a mold and the other surface is mechanically finished after the lens has been cured. The semi lenses, accordingly, are made in stages, in which one surface is finished by a mold and the other surface is machine finished after curing. The surface of the lens formed by a mold is usually the front spherical surface, with or without add power.

The unfinished side of a semi lens is usually surfaced using a special lathe or generator in the same way as glass lenses, but other abrasives are used. The polymeric lens is mounted on a circular holder and the surface generated by a diamond grinding wheel. The curvatures are controlled by the relative positions and angles of the diamond wheel in relation to the lens. This surface is then smoothed and finally polished with the appropriately-faced tool. Metal tools are used to smooth and polish, each surface configuration having its own tool. A great number of tools are, therefore, required to enable a complete range of lenses to be surfaced. Semi-finished lenses are generally put into stock and machined when needed, e.g., a customer with a specific prescription orders the lens.

Semi lenses are used instead of by direct polymerization lens for very powerful lenses, such as aphakic lenses or lenses with a very high cylindrical power. These powerful lenses cannot be made by direct polymerization because the difference in thickness between the center and the edges of the lens create large stresses that can break the glass molds with the T-gasket.

Another reason for making a semi lens is because of the numerous lenses required for different consumers, which is not conducive for mass production. For example, a prescription may require a certain add power on the front surface and an astigmatic back surface set at one of many different orientations. That is, the add power portion must be oriented so that the flat top is horizontal, but the orientation of the astigmatic surface varies as the elongated portion of the cornea differs from person to person. As one skilled in the art appreciates, numerous permutations exist for a specific add power and a given astigmatic back surface at different orientations. Mass production of an infinite variation of lenses is unfeasible and, accordingly, retail suppliers usually purchase a semi lens and machine the astigmatic surface immediately before sale.

SUMMARY OF THE INVENTION

The present invention overcomes the disadvantages of the prior art and revolutionizes the lens-forming process. Specifically, the present invention encompasses a gasket that can be used to form all powers and geometric shapes of lenses, unlike the prior art T-gasket which is limited to forming one specific lens. The present invention also includes an apparatus and method for forming lens using automation processes. Moreover, the present invention includes a method for curing the formed lens in a fraction of the time as the prior art processes require. Furthermore, the present invention includes an apparatus and method for separating the cured lens from the molds used for forming and shaping the lens.

The gasket of the present invention is designed so that either or both of the front mold and the rear mold are movably disposed within its bore. At least one of the molds is axially movable within the bore relative to the other mold to a desired axial separation distance between the molds. Each of the different desired axial separation distances corresponds to a separate lens power. The gasket of the present invention, unlike the T-gasket, also accepts various molds having different surfaces (i.e., spherical or astigmatic) to make the desired lens surface. Since a single gasket is used to form multiple powers of the lenses and different lens surfaces, the gasket of the present invention is referred to as a "universal gasket."

Additionally, as those skilled in the art are aware, the prior art T-gasket positions and holds the molds at a set separation, which presents a problem because the volume of monomer shrinks approximately ten to fifteen percent when it is cured. Since the molds remain stationary using the T-gasket, this shrinkage creates internal stresses in the lens so that annealing is sometimes required. In contrast, the gasket of the present invention reduces stresses by allowing some axial movement of the molds as the monomer volume shrinks during curing. Thus, annealing is usually not need for lenses made with the gasket of the present invention.

The casting method of the present invention encompasses positioning at least one of the two molds both rotationally and axially relative to the other mold so that a lens of the correct thickness and power can be formed therebetween. That is, rather than relying on the gasket design for setting the dimensions of the lens, the present invention uses automation technology, including state-of-the-art motion control devices having exacting tolerances, to position the molds within the gasket at the appropriate axial separation distance from each other. The present invention also includes automated technology for rotating the molds relative to each other to the proper orientation, e.g. the toric back surface mold is rotated to be properly aligned with the add power.

The desired lens is then formed by injecting the monomer into the volume defined by the two molds and the bore of the gasket. The monomer is injected by a needle instead of pouring the monomer into the gasket and spilling the excess off when the rear mold is positioned onto the gasket. The filling method used with the present invention significantly reduces the quantity of monomer wasted and decreases the chances of air bubbles being formed into the lens.

Lens manufacturing is more economic and efficient using the present invention because the quantity of lens mold equipment necessary for lens manufacturing is significantly reduced, as well as drastically reducing—if not eliminating—use of the hand-labor previously involved in forming the lenses.

Furthermore, lenses produced using the present invention are improved over the prior art. The quality of the machined finished surface of a cut and polished lens from a semi is lower than that produced directly by a glass mold. As one skilled in the art appreciates, craftsmen form the front and rear glass molds by expending a tremendous number of hours cutting, grinding, and polishing the molds to make them as perfect as possible, whereas often a lens surface cut by a generator may lack this precision.

The present invention, therefore, allows custom production of any axis orientation lens instantaneously using a single universal gasket design for a particular prescription. Unlike the prior art systems, no further lens cutting or lens generation is required. That is, once a lens is cured using the present invention, it is a finished product, unlike the semi-finished lens in the prior art. The present invention, accordingly, is quicker and cheaper than the prior art techniques.

The present invention also significantly reduces the time required to cure the monomer. As noted above, the prior art curing can take fourteen hours or more, depending on the lens design. The present invention has a one-step process, which is viable with use of the universal gasket of the present invention. In fact, lenses can be cured in about one minute.

Still another aspect of the present invention is a method and apparatus for separating the cured lens from the molds, comprising directing a fluid, such as carbon dioxide gas, at the interface of the lens and one mold. The gas, which is a temperature lower than the mold-lens-mold sandwich which has just been cured, causes the components to contract. The polymer forming the lens and the glass molds have different coefficients of thermal expansion causing a differential contraction rate. This differential contraction assists in breaking the bond between the surface of the molds and the respective surface of the lens. This aspect of the present invention is an improvement over the prior art techniques, which usually require physically pulling the components apart.

The present invention allows lenses to be made quickly to match the specific prescription. The speed with which a lens can be made—regardless of the lens power and surface shapes—is vastly reduced compared with the prior art. For example, prior art systems allow merchants to sell lens in about one hour, but only if the lens is a standard stocked lens. That is, one-hour service is not available if the prescription is for a toric lens with add power. In this situation, the prior art requires that the merchant use a semi with add power on the front surface and cut the back surface of the lens into the desired toric prescription with a generator. As one skilled in the art appreciates, use of a generator is time intensive and, accordingly, an exception to the one-hour policy. The present invention, in comparison, allows the formation and curing of a lens in less than thirty minutes, which is faster than retailers produce a limited quantity of lenses and days faster than the time to form other lenses from a semi.

The present invention, moreover, provides an opportunity for the doctors to make the lenses which they prescribe in their offices—with only a short waiting period for the patient. Given the speed that the present invention makes lenses and the short curing time, this option is prudent from a business standpoint by providing "one-stop" shopping for the patient/customer. Thus, the patient can have an eye examination, wait about thirty minutes and leave with glasses that were made to match the prescription from the examination.

BRIEF DESCRIPTION OF THE FIGURES OF THE DRAWINGS

FIG. 1 is a cross-sectional view of a prior art T-gasket.

FIG. 2 is a cross-sectional view of a step gasket of the present invention.

FIG. 3 is a cross-sectional view of a straight-walled gasket of the present invention that shows ports in the gasket.

FIG. 4 is an exploded cross-sectional view of the molds and a gasket, in which the front mold defines an annular ring circumscribing its edge.

FIG. 5 is a perspective view of the present invention showing an assembly station, robotic arm, and filling stations.

FIG. 9 is a perspective view of a radial clamp used with the present invention.

FIG. 10 is a side view of a robotic arm used in conjunction with the present invention.

DETAILED DESCRIPTION OF THE INVENTION

Figure 6:
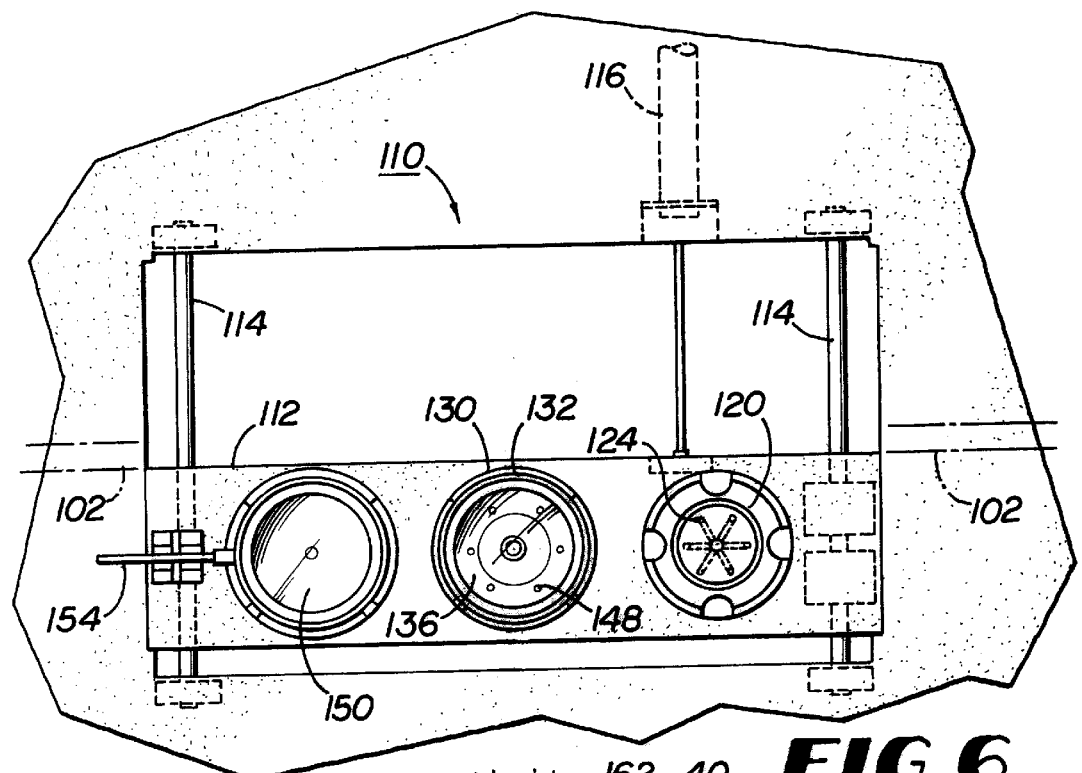
FIG. 6 is a top plan view of the assembly station disposed outside the hood.

The present invention is more particularly described in the following examples that are intended as illustrative only since numerous modifications and variations therein will be apparent to those skilled in the art. As used in the specification and in the claims, "a" can mean one or more, depending upon the context in which it is used. The preferred embodiment is now described with reference to the figures, in which like numbers indicate like parts throughout the figures.

OVERVIEW

Referring generally to FIGS. 2–17B, the present invention comprises a method of lens casting and a gasket therefor. The present invention also encompasses a method for curing the casted lens and an apparatus and method for separating the cured lens from the components used for casting the lens.

THE GASKET OF THE PRESENT INVENTION

The gasket 20 of the present invention can be used to form lenses of varying power, unlike prior art gaskets that require a different design for each lens variant to be formed thereby. Referring to FIGS. 2 and 3, the gasket 20 of the present invention has a first end 22, an opposed second end 24, a body portion joining the first end 22 to the second end 24, and a longitudinal, or axially, extending axis L. The gasket 20 has an outer surface 26 and defines a bore 30 extending axially through the gasket 20 between its opposed ends 22, 24. The bore 30 forms an interior surface 32 that circumscribes the longitudinal axis L of the gasket 20.

The outer surface 26 of the gasket 20 is preferably circular or annular (as shown in perspective in FIG. 9), so that the preferred embodiment of the gasket 20 is essentially tubular. Although other shapes can be used (e.g., an elliptical cross-section, a polygonal cross-section, or other non-circular shape), the circular cross-sectional embodiment is preferred for its acceptance in the art, manufacturing considerations, and ease of automation.

The bore 30 of the gasket 20 receives both a front mold 40 and a rear mold 50 therein. As best shown in FIG. 4, the front mold 40 has a forward surface 42, an opposed back surface 44, and an edge 46 circumscribing it. The edge 46 is of a size to be complementarily received within at least a portion of the bore 30 so that the edge 46 and the interior surface 32 of the gasket 20 form a substantially leak-proof seal therebetween.

The rear mold 50 likewise has a forward surface 52, an opposed back surface 54, and a rim 56 circumscribing it. The rim 56 is sized to be complementarily received within at least a portion of the bore 30 so that the rim 56 and the interior surface 32 of the gasket 20 also form a substantially leak-proof seal therebetween. Since the preferred embodiment of the gasket 20 is circular in cross-section as shown in FIG. 9, the molds 40, 50 preferably are also circular and have a diameter. When the front mold 40 and the rear mold 50 are both disposed within the bore 30 of the gasket 20 as shown in FIGS. 2 and 3, the combination of components is called a lens-forming assembly 10, a lens-forming structure, or a lens casting cell.

A volume is formed defined by the back surface 44 of the front mold 40, the forward surface 52 of the rear mold 50 and the interior surface 32 of the gasket 20 when the molds 40, 50 are disposed within the gasket 20. That is, the molds 40, 50 are placed in a spaced-apart relationship within the bore 30 so that a volume is formed therebetween. This volume, referred to as the cavity 31, preferably has appropriate dimensions to form a desired lens when a lens-forming fluid is injected into the cavity 31 and cured therein. The cavity 31 is also shown in phantom in FIG. 4.

The lens-forming fluid is preferably a monomer. The preferred monomer is manufactured by P.P.G. located at Monroeville, Ga., and sold under the tradename CR424. As one skilled in the art will appreciate, other lens-forming fluids known in the art can be used with the present invention.

The present invention also includes a means for injecting the monomer into the cavity 31. The preferred injecting means includes an injection needle, which is discussed in more detail below. The present invention also comprises a means for providing fluid communication between the outer surface 26 of the gasket 20 and the bore 30. The preferred providing means includes a vent needle, which communicates with the bore 30, thus allowing fluid communication between air in the cavity 31 and outside the outer surface 26 to facilitate injecting the monomer and axial movement of the molds 40, 50.

The front mold 40 or the rear mold 50 is axially movable within the bore 30 relative to the other mold to a desired one of a plurality of axial separation distances between the molds. The volume is different for each axial separation distance and, accordingly, the dimensions of the lens formed within the cavity 31 are also different for each axial separation distance. As discussed in more detail below, the filling station of the present invention uses a computer subsystem (or a controller such as a computer or microprocessor), robotic arm and linear actuators or servo motors to position the rear mold 50 exactly at a predetermined position relative to the front mold 40 in the bore 30. Since the automation includes state-of-the-art motion control devices having exacting tolerances, the quality of the lens that the present invention produces is improved over prior art systems.

Referring to FIG. 2, the bore 30 of the gasket 20 forms a first diameter adjacent the first end 22 thereof that decreases along a portion of the length of the bore 30. The first diameter is of a size to complementarily receive the edge 46 of the front mold 40. The bore 30 also forms a constant second diameter adjacent the second end 24 of the gasket 20 that extends along a portion of the length of the bore 30, in which the second diameter is of a size to complementarily receive the rim 56 of the rear mold 50.

A transition section 34 exists within the bore 30 between the first diameter and the second diameter. The transition section 34 comprises an insert step 36, or ridge, for locating the front mold 40 at a fixed, known location within the bore 30. The transition step 36 is formed in the interior surface 32 of the gasket 20 at the juncture of the first diameter and the second diameter. The front mold 40 is slidably received along the interior surface 32 of the gasket 20 until it engages the step 36 of the transition section 34. A portion of the back surface 44 of the front mold 40 adjacent the edge 46 is shaped to complementarily engage the transition section 34 to form a substantially leak-proof seal therewith. That is, the transition section 34 has an angular geometry and the front mold 40 has a corresponding angular edge 46 that complementarily mates with a portion of the transition section 34 to form a seal which substantially prevents leakage of the monomer disposed in the cavity 31. The angle of the transition section 34 can be a right angle relative to the interior surface 32 to a twenty degree or more offset from the right angle orientation, preferably at a ten degree offset. The transition section 34 and the edge 46 of the front mold 40 can alternatively have other mating shapes so that a leak-proof seal exists therebetween.

In this embodiment, the rear mold 50 is axially movable along at least a portion of the bore 30 for placement at the desired axial separation distance from the front mold 40, which is stationarily disposed in the transition section 34. Because the gasket 20 of the present invention is designed to be used with automation technology, the second diameter is constant along the interior surface 32 of the bore 30 between the transition section 34 and the second end 24 of the gasket 20. The diameter of the rear mold 50 is substantially the same as the second diameter so that the rear mold 50 can be inserted into the bore 30 and axially slid therealong to the desired axial separation distance from the front mold 40. As discussed above, when the front mold 40 and rear mold 50 are both disposed within the bore 30 of the gasket 20, the cavity 31 defined by the molds 40, 50 and the interior surface 32 of the gasket 20 can hold a fluid, such as the liquid monomer, without leaking.

In a variation of the gasket having the transition section which is not shown, the first diameter of the bore can remain constant from the first end of the gasket moving inward and then abruptly expand to form an axially-extending gap adjacent the transition section. The gap is of a dimension to complementarily receive the edge of the front mold therein. This embodiment similarly locks the front mold into position adjacent the transition section. That is, when the front mold is axially inserted into the bore, it snaps into a position in the gap to be stationarily and detachably maintained adjacent the transition section.

Another embodiment of the present invention shown in FIG. 3 comprises a gasket 20 without a transition section or a step. Instead, the first diameter and the second diameter are the same so that the bore 30 has a constant diameter along its entire length. Thus, similar to the slidably positioning of the rear mold 50 in the transition section gasket embodiment, the front mold 40 and/or rear mold 50 are movably positioned within this straight-walled gasket. As one skilled in the art will appreciate, one mold can remain at a set position while the other mold is moved axially within the bore 30, similar to the transition section embodiment. Alternatively, both molds 40, 50 can be independently moved, either simultaneously or at different times, relative to each other. The preferred embodiment of the gasket 20 also has a key notch 28 adjacent its second end 24 to ensure the gasket 20 is correctly aligned in the lens forming process.

In comparing the transition section and straight-walled gasket embodiments, the disadvantage of the transition section gasket is that a small amount of the liquid monomer can seep into and spread between the transition section 34 and the front mold 40, although not substantially leaking past the front mold 40. Thus, the cured lens—when removed from the gasket 20—may not be "clean" along its outer periphery and thus requires post-cure machining to remove the lens material that leaked into the juncture of the front mold 40 and the transition section 34. Also, some monomer may be left in the bore 30 adjacent the transition section 34, which must be cleaned and removed before the gasket 20 can be reused. Thus, additional time and expense may be required to reuse the transition section gasket embodiment because of machining the cured lens and/or cleaning the gasket 20 and front mold 40 for reuse. Another associated drawback is that the number of uses, or life, of the gasket having the transition section 34 may potentially be shortened by the cleaning preformed thereon. The transition section gasket embodiment, however, is simpler to use in an automated system because the front mold 40 is at a known position and the rear mold 50 is axially moved relative to that fixed position to the desired axial separation distance.

Although the automation is more complicated for the straight-walled embodiment, using this gasket may nevertheless be less expensive in the long term because of the substantial reduction of cleaning costs to the front mold and gasket. Thus, the straight-walled embodiment may have a longer useful life.

Referring again to both FIGS. 2 and 3, each of the gaskets 20 of the present invention preferably further comprises at least one, and optimally two, ports 38, 39 formed in the body portion of the gasket 20 between its outer surface 26 and interior surface 32. The ports 38, 39 are in fluid communication with the bore 30, specifically the cavity 31 formed between the back surface 44 of the front mold 40, the forward surface 52 of the rear mold 50 and the interior surface 32 of the gasket 20. Each port 38, 39 is adapted to receive a portion of a needle therein so that the needle is in fluid communication with the cavity 31 without being inserted into the bore 30 itself. The injection needle is placed in fluid communication with one port (the injection port 38) and the vent needle is in fluid communication with the other port (the vent port 39). That is, one port 38 is used to add monomer into the cavity 31 and the other port 39 is used to vent air within the cavity 31 when displaced by the incoming monomer. The vent port 39 also provides fluid communication between outside the gasket 20 and the cavity 31 to allow air displaced by axially moving the molds 40, 50 relative to each other to enter or exit the volume, depending on the relative axial motion of the molds 40, 50. Preferably, the needles penetrate the gasket 20 into a respective port 38, 39 in a direction substantially parallel to the longitudinal axis L of the gasket 20, as opposed to at a steeper angle. This small angle or parallel alignment with the longitudinal axis L minimizes the chances that the tip of the needle could contact one of the molds 40, 50. However, the steeper angle can be perpendicular to the longitudinal axis L and the gasket 20 still function properly.

The ports 38, 39 are advantageous when the cavity 31 is relatively small, e.g., the back surface 44 of the front mold 40 is very close to the forward surface 52 of the rear mold 50. In this situation, inserting the tip of the needle into the bore 30 could contact one or both of the surfaces 44, 52 of the two molds 40, 50. Such contact could potentially damage one surface of a mold or displace one mold so that the lens is not the correct dimension or leakage occurs when the monomer is injected into the cavity.

It is also contemplated simply having a hole (not shown) through the gasket 20 to vent the air in the cavity. That is, the cavity 31 communicates directly with the outside air instead of through the port 39 and needle.

Another aspect of the gasket 20 of the present invention is the gasket material. In the presently preferred embodiment, a desirable characteristic is that the gasket material is chemically compatible with the lens-forming fluid to avoid inhibiting polymerization of the fluid. The gasket material should not include free-radical inhibitors, such as "UV" stabilizers and antioxidants. A UV stabilizer can leach into the monomer because the monomer acts almost like a solvent to draw such an additive out of the gasket material and to mix locally into the monomer, causing the edges of the lens remain slightly wet after curing. The wetness can be a problem because it potentially results in the monomer adhering to the gasket 20 and molds 40, 50, which requires cleaning before reuse and increases operating expenses. Accordingly a desired gasket is a polymeric elastomer compatible with optical monomers which will not inhibit lens monomer during the curing process. Still another aspect of the gasket material is that it be relatively soft, for example having a durometer between 40 and 70. Another concern is whether the gasket material has long-term stabilities.

In the presently preferred embodiment, a suitable gasket material is thermoplastic rubber that contains KRATON®G, a styrene-ethylene-propylene (butylene) block copolymer, sold by Shell Oil Company® of Houston, Tex. Such rubber includes those sold under the trade names DYNAFLEX®G2703, 2711, and 2712 by GLS Corporation of Cary, Ill. These rubbers have a Shore A hardness ranging from about 43 to 62, a specific gravity of about 0.9 g/cc, a tensile modulus at 300% elongation ranging from about 355 to 470, tensile strength at break of about 680 to 1000 psi, and a tear strength of about 113 to 127. Another contemplated gasket material includes a PVC formulation. The gasket material of the present invention, however, is not limited to a single material. In fact, the desired gasket material can very depending on the specific monomer compound used to form the lens. That is, a certain gasket material may be preferred with a particular lens-forming fluid and different type of gasket material with another lens material. Other contemplated materials include elastomeric PVC, silicon, ethylene vinyl acetate, or a mixture thereof.

The present invention also preferably includes a means for sealing the gasket 20 after the vent needle 232 or injection needle 252 has been removed from the gasket 20. Preferably, the sealing means comprises the gasket 20 being formed of PVC, silicon, KRATON®G, ethylene vinyl acetate or a mixture thereof. That is, the gasket material is self-sealing so that the compound prevents leakage after the needles have been removed.

Other sealing means contemplated include, for example, the needle hole being physically plugged when the needle is removed. Alternatively, the sealing means can comprise the needle remaining in the gasket to prevent leakage of the fluid therefrom, but this embodiment is undesirable because of the handling limitations with a portion of the needle extending out of the gasket 20 and processing limitations with constantly replacing the needle at the filling station. Still another embodiment of the sealing means is curing the monomer that leaks into the needle hole by, for example, quickly exposing that monomer adjacent the exit hold of the needle to UV light, heat, or other curing source. Instead of the monomer in the needle hole solidifying as the sealing means, heat applied to the gasket 20 itself can alternatively seal the needle hole.

Referring again to FIG. 4, an alternative embodiment of the molds is shown. The front mold 40 has an annular ring 60 circumscribing the edge 46 adjacent the back surface 44. The annular ring 60 increases the area in the cavity 31 adjacent the forward surface 52 of the rear mold 50, thus allowing better communication with the ports 38, 39 or with the tip of a needle if the needle is inserted substantially perpendicular to the longitudinal axis L. The resulting bulge in the formed lens will be removed during processing after curing is completed. As one skilled in the art will appreciate, an annular ring can alternatively or additionally be included on the forward surface 52 of the rear mold 50.

THE METHOD AND APPARATUS OF LENS CASTING

As an overview, the lens-forming assembly 10 is first processed at an assembly station 110 and then at a filling station 200, which are shown generally in FIG. 5 and collectively referenced as 100. A frame 104 supports the stations 110, 200. In the preferred embodiment, the molds 40, 50 are rotationally aligned relative to each other and placed within the bore 30 of the gasket 20 at the assembly station 110. At the filling station 200, the molds 40, 50 are axially moved within the bore 30 to be spaced apart from each other the desired axial separation distance (e.g., the appropriate separation to produce a lens of a desired thickness). The lens-forming fluid is also injected at the filling station 200 into the cavity 31 formed between the two molds 40, 50 and the bore 30. The method of the present invention is discussed based on using the transition section gasket embodiment, as opposed to the straight-walled gasket.

A. The Assembly Station

Referring now to FIGS. 5–8, the assembly station 110 comprises a means for supporting the gasket 20 so that the molds 40, 50 are insertable into the bore 30. The assembly station 110 preferably has three positioning collets: a front mold positioning collet 120, a rear mold/gasket positioning collet 130, and a clamp positioning collet 150. The collets are arranged on a plate 112 which slides along rails 114. A drive cylinder 116, such as a pneumatic or an electric cylinder, moves the sliding plate 112 along the rails 114 between a loading position and an assembly position. In the loading position, which is shown in FIG. 6, the sliding plate 112 is disposed outside the periphery of a hood 102 and, in the assembly position shown in FIG. 5, the plate 112 is within the periphery of the hood 102.

The hood 102, which is preferably formed of glass or see-through plastic, acts as a barrier and covers the filling station 200 and a robotic arm 160 (which is discussed below) to ensure that the operator is protected from interfering with the components. The hood 102 is also used for safety considerations, such as to protect the operator from being inadvertently contacted by the robotic arm.

In the preferred embodiment, the front molds 40 are stored at one storage station (not shown) located near the assembly station 110. The gaskets 20 are stored at another location, which is also positioned near the assembly station 110, or at the same storage station as the front molds 40. The gaskets 20 preferably each have one rear mold 50 disposed in their respective bores 30. As discussed in more detail below, the rear molds 50 are preferably placed in the bore 30 of a respective gasket 20 after completion of the curing process and after the cured lens is separated from the two molds 40, 50. As one skilled in the art will appreciate, the gasket 20 and molds 40, 50 can be stored in different combinations, e.g., the molds 40, 50 and gaskets 20 all stored as separate components, the front mold 40 disposed in the gasket 20 and the rear mold 50 stored separately, or both molds 40, 50 disposed and stored within the bore 30 of the gasket 20.

To start the process in the preferred embodiment, the operator enters the parameters of the lens to be formed (e.g., the prescription including add power) into the computer subsystem (not shown), such as by a keyboard. The computer subsystem also includes a memory subsystem and a hard disk to run computer programs. The power means (not shown) used to power electrical components in the present invention, such as the computer subsystem, is preferably a 120V AC power source.

Algorithms used in a computer program determines the appropriate front and rear molds 40, 50 to be used to form the desired lens and the computer subsystem then provides an output indicating the correct molds to use. The front mold 40 is usually spherical and the rear mold 50 is spherical or astigmatic, e.g., toric or cylindrical. The front mold 40 can also be adapted to form bifocals or trifocals for the add power.

In one embodiment of the present invention, the computer subsystem displays on its monitor the output indicating the appropriate molds to use. Another embodiment additionally illuminates a light (not shown) at the storage stations above the specific location where the appropriate molds are stored. The indicating lights assist the operator in locating the appropriate molds to reduce the chance of the operator inadvertently picking an incorrect mold to make the lens.

One means for transferring the components of the lens-forming structure 10 to the sliding plate 112 of the assembly station 110 is the operator physically moving the components. The present invention can also use an automated means (not shown) for moving the components of the lens-forming structure 10 to the plate 112 of the assembly station 110. In the automated system, the computer subsystem directs an electronically-controlled arm (not shown) to transfer the appropriate molds 40, 50 and one gasket 20 to the plate 112 of the assembly station 110. Once the molds 40, 50 and gasket 20 are transferred to the plate 112, then the plate 112 slides along the rails 114 to the assembly position within the periphery of the hood 102 from the load position.

The front mold positioning collet 120 of the assembly station 110 has an upstanding circular lip 122 adapted to receive one front mold 40. Other front mold supporting means include a vacuum support (not shown), spring clips (not shown), and the like. The front mold positioning collet 120 can have a light (not shown) to indicate that a front mold is disposed on the collet or an interlock to block the process from continuing until a front mold is positioned on the collet 120.

The rotational orientation of a spherical front mold 40 does not present an issue when placing it on the front mold positioning collet 120. However, orientation is important for a front mold adapted to form an add power lens or an asymmetrical mold. In the preferred embodiment, the front mold positioning collet 120 is marked with a series of parallel marking lines (not shown). The operator aligns the line forming the top portion of the flat top so that it is aligned with or parallel to the marking lines. Thus, a front mold having add power can be placed at one of two positions, which are offset 180° from each other and both parallel to the marking lines. For progressive add power front molds in which no discernable markings exist on the front mold or asymmetrical front molds, the mold can be etched or scribed with a line to use for alignment. An electronic eye (not shown) or the like can be used to verify proper positioning before allowing the process to continue. Alternatively, the automated embodiment using an imaging system can properly orient the front mold on the front mold positioning collet 120.

One reason for properly orienting the add power is so that its flat top portion is oriented vertically during filling the cavity 31 with the lens-forming fluid to prevent air bubbles from being trapped. Bubbles are more likely to remain in the cavity 31 if, for example, the flat top is horizontally oriented during filling. Additionally, it is important that the front mold 40 be properly positioned relative to an astigmatic rear mold 50 to ensure that the add power is correctly oriented on the formed lens.

The front mold positioning collet 120 preferably also has a plurality of air holes 124 or recessed vents that direct ionized air from an ionized air supply (not shown) toward the back surface 44 of the front mold 40. The ionized air ensures that dust and other impurities are removed before the front mold 40 is placed into the bore 30 of the gasket 20, which occurs as discussed below.

The rear mold/gasket positioning collet 130 has a gasket support lip 132 adapted to support the second end 24 of the gasket 20 thereon, which is the end of the gasket 20 closest to the rear mold 50 disposed within the bore 30. As with the front mold 40, the operator, or alternatively an automated system, places the gasket 20 with the rear mold 50 therein on the collet 130. Other means (not shown) for supporting the gasket 20 and rear mold 50 include separate collets for each component, vacuum collets, grippers, or the like.

As discussed above, the rear mold 50 is preferably placed into the bore 30 of the gasket 20 before placing the rear mold 50 at the storage station. It is important to have the rear mold 50 at a predetermined orientation within the bore 30 of the gasket 20. The front and rear molds 40, 50 do not initially need to be in a correct relative orientation to each other, but instead at known positions from which one mold can later be rotated to align correctly with the other mold.

The rotational position of the gasket 20 when placed at the assembly station 110 is important so that the rear mold 50 will be at a known rotational orientation on the rear mold/gasket positioning collet 130. Also, the position of the gasket 20 is important because it may have ports 38, 39 formed therein into which the injection needle and vent needle are inserted. Accordingly, as shown in FIGS. 2 and 3, the preferred embodiment of the gasket 20 has a key notch 28 adjacent its second end 24 or other means to ensure the gasket 20 is correctly aligned on the support lip 132. In one embodiment, if the key notch 28 of the gasket 20 is not properly aligned, then an interlock means (not shown) blocks the lens forming process from continuing. For example, the sliding plate 112 will not move from the load position to the assembly position until the interlock means is satisfied by the gasket 20 being properly positioned on the rear mold/gasket positioning collet 130. The interlock means can also provide a visual indication, such as warning light at the assembly station 110 or a message on the monitor of the computer subsystem.

The assembly station 110 also comprises a means for inserting the front mold 40 into the bore 30 of the gasket 20, which preferably is a movable arm. Other contemplated embodiments of the front mold inserting means (not shown) include the operator manually moving and inserting the front mold 40 and use of slides, pneumatics, linear motors, gantry robots, and the like.

The movable arm used in the preferred embodiment picks up the front mold 40 disposed on the front mold positioning collet 120 and axially pushes the front mold 40 into the bore 30 of the gasket 20 through its first end 22 until the back surface 54 of the front mold 40 contacts the insert step 36 of the transition section 34. As discussed above in the gasket description, the transition section 34 is used for positioning the front mold 40 at a fixed, known location and forms a substantially leak-proof seal between the front mold 40 and the step 36. Once the front mold 40 is properly positioned within the bore 30 of the gasket 20, the movable arm disengages from the inserted mold and is moved to an out-of-the-way position or, alternatively, remains engaged to the front mold 40 to support the gasket 20 on the rear mold/gasket positioning collet 130.

In the preferred embodiment, the movable arm is a robotic arm 160 shown in FIGS. 5 and 10 having a pneumatic gripper 162 that detachably engages the forward surface 42 of the front mold 40. An example of the robotic arm 160 is commercially available from Mitsubishi® Electronic under the tradename "Movemaster RV-M2." The computer subsystem directs and controls operation of the robotic arm 160. The robotic arm 160 may also include an internal computer that interfaces with the computer subsystem to control movements of the robotic arm 160.

As best shown in FIG. 10, the body of the robotic arm 160 is disposed within the periphery of the hood 102. A shoulder 164 connects the body of the robotic arm 160 to its upper arm, which is connected by an elbow 166 to the forearm 167. The pneumatic gripper 162 is connected to the forearm 167 of the robotic arm 160 at a wrist 168. The robotic arm 160 has a full range of motion due to horizontal rotation at the pivot at the base and vertical lift by movement of the shoulder 164, elbow 166, and the wrist 168 of the robot. A wrist tool plate 169, located between and connected to the pneumatic gripper 162 and wrist 168 of the robot, provides full rotational movement for the pneumatic gripper 162. The robotic arm 160 offers five degrees of freedom, not including the hand, and a large position memory and is driven by DC servo motors (not shown) and contains internally-routed pneumatic lines (not shown).

A contemplated embodiment of the present invention entails the robotic arm 160 orienting the front mold 40 to a desired orientation when moving the front mold 40 into the bore 30 of the gasket 20, regardless of its initial orientation when placed on the front mold positioning collet 120. That is, the robotic arm 160 twists the front mold 40 as necessary to position it properly within the bore 30 at a predetermined orientation relative to the gasket 20. The front mold 40, however, would need to be marked by a means detectable by the robotic arm 160 so that the robotic arm 160 has a reference point.

The assembly station 110 also preferably includes a means for inserting the rear mold 50 into the bore 30 of the gasket 20. The rear mold inserting means, which is a part of the rear mold/gasket positioning collet 130, also preferably further comprises a means for removing the rear mold 50 from the bore 30 of the gasket 20. Thus, the rear mold inserting means can both insert the rear mold 50 into the bore 30 and remove the rear mold 50 from within the bore 30.

The rear mold inserting means preferably comprises a movable piston 134 adapted to detachably engage a portion of the rear mold 50, e.g., its back surface 54, and remove the rear mold 50 from the bore 30 of the gasket 20 or insert the rear mold 50 therein. More specifically, the rear mold inserting means comprises a mold support plate 136 adapted to detachably engage the back surface 54 of the rear mold 50 and a means, connected to the mold support plate 136, for moving the mold support plate. The movable mold support plate 136 for the rear mold 50 is circumscribed by the support lip 132 of the rear mold/gasket positioning collet 130.

Figure 7:
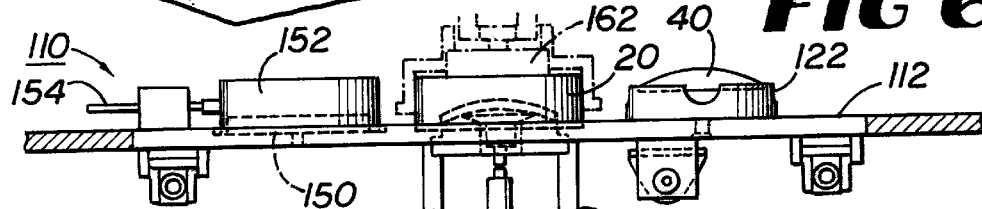
FIG. 7 is a side cross-sectional view of the assembly station with the piston up.
Figure 8:
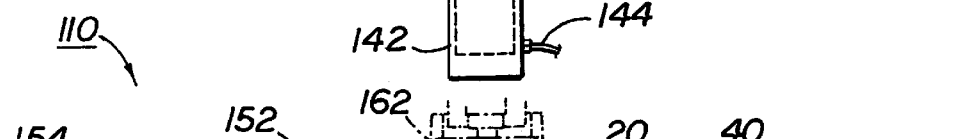
FIG. 8 is a side cross-sectional view of FIG. 7, in which the piston is down and also showing the camera.

The mold support plate 136 is movable between an insert position shown in FIG. 7, in which the mold support plate 136 is substantially at the same height as the support lip 132, and a retracted position. In the retracted position shown in FIG. 8, the mold support plate 136 is moved, or retracted, into a support frame 138, which comprises a plurality of upstanding support rods 139 extending between the support lip 132 and a cylinder mounting plate 140. The mold support plate 136 is disposed adjacent the cylinder mounting plate 140 when fully in the retracted position. A portion of a "T"-shaped piston 134, which moves within a cylinder 142, is fixedly attached to the mold support plate 136. Although other driving means (such as an electrical solenoid) can be used, the "T"-shaped piston 134 is preferably pneumatically controlled and moves in response to a positive air pressure applied to a cylinder 142 through an appropriate air port. That is, the piston 134 is moved upwardly within the cylinder 142 in response to pressurized air applied through a first port 144 and downwardly in response to pressurized air applied through a second port 146. The mold support plate 136 correspondingly moves with the attached piston 134.

When the rear mold 50 and gasket 20 are loaded onto the rear mold/gasket positioning collet 130, the rear mold 50 is adjacent the mold support plate 136. A plurality of vacuum ports 148, which are connected to a vacuum source (not shown), are located in the mold support plate 136. When the mold support plate 136 is at the insert position, the vacuum ports 148 communicate with and create a suction force on the back surface 54 of the rear mold 50 by activation of the vacuum source. The suction force is sufficient to pull and separate the rear mold 50 from within the bore 30 when the mold support plate 136 is moved toward the retracted position. That is, the rear mold 50 is pulled out of the bore 30 by activation of a vacuum source and concurrent movement of the rear mold support plate 136 to the retracted position. The rear mold 50 is retracted from the gasket 20 in the preferred embodiment approximately the same time as the robotic arm 160 is moving the front mold 40 from the front mold positioning collet 120 and inserting it through the first end 22 of the gasket 20.

The present invention also comprises a means for rotating the gasket support means relative to the longitudinal axis L of the gasket 20. An astigmatic mold surface has different radii in different axes. As one skilled in the art will appreciate, the orientation of the rear mold 50 relative to the front mold 40 is critical, particularly for a front mold designed to form a multi-focal lens having add power. Thus, adjustment of the rotational position of the rear mold 50 relative to the front mold 40 may be required, which can occur when the rear mold 50 is in the retracted position using a rotating means.

The rotating means encompasses the computer subsystem directing one of the support lip 132 or the mold support plate 136 to rotate or twist the gasket 20 or the rear mold 50, respectively, a desired number of degrees, if necessary. Pressurized air then moves the piston 134 and the mold support plate 136 back to the insert position so that the rear mold 50 is reinserted into the bore 30 of the gasket 20 at the orientation to which it has rotated. Thus, the rear mold 50 will be at a desired rotational orientation relative to the front mold 40 when reinserted, which provides the proper orientation of an astigmatic rear mold 50 relative to the front mold 40. It is presently preferred to rotate the support lip 132 and connected gasket 20 and front mold 40 instead of rotating the mold support plate 136 holding the rear mold 50.

The present invention also preferably further comprises a means for determining a selected dimension of the rear mold 50, specifically the height of the rear mold 50. The preferred embodiment of the present invention operates on the premise that the dimensions of the front mold are held within specified tolerances, which is fairly accurate because of the grinding techniques used to form the front mold. However, such a premise is less accurate for the rear mold 50, particularly for its center thickness, or height when the mold is horizontally disposed. That is, the height from the back surface 54 of the rear mold 50 to the top of the forward surface 52 of the rear mold 50 used to make the same type of lens can be slightly different among the different rear molds. The tolerances among rear molds is the biggest variable in forming the lens and, in fact, can be greater than five hundredths (0.05) of a millimeter, which is the minimum tolerance needed to ensure the desired accuracy to form the lens in the preferred embodiment. Thus, the present invention uses a determining means.

To determine the height of the rear mold 50, the determining means in one embodiment comprises a means for optically receiving an image of at least a portion of the profile of the rear mold 50 when in the retracted position, a means for digitizing the image of the rear mold 50, and a means for creating information from the digitized image of the rear mold 50, such as information about the height or thickness of the rear mold 50. The creating means generates a signal that is communicated to the computer subsystem and stored in its memory subsystem.

A camera 149, the preferred optically receiving means, is positioned to view the rear mold 50 when the mold support plate 136 is moved to the retracted position. The CCD or similar camera 149 records the image of the rear mold 50, which the digitizing means and creating means use to determine the height of the rear mold 50. The camera 149 can also use gain control, an automatic iris, and the like to ensure that the image of the rear mold 50 is received properly.

The digitizing means can be a frame grabber (not shown), which is also known as a capture board. Other contemplated embodiments of the digitizing means are a digital camera to replace the analog camera and frame grabber, a scanable linear sensor, and the like. The creating means and the digitizing means can be integral as the same component.

In still another embodiment, the molds 40, 50 can be premeasured and marked with a bar code that represents the measurements. The operator scans the bar code, which signals the computer subsystem with the dimensions of the rear mold 50 before placing the rear mold 50 onto the rear mold/gasket positioning collet 130. The bar code can be placed in ink on one mold face (e.g., the forward surface 52 of the rear mold 50) so that the bar code image transfers onto the cured lens, which assists in tracking the lens. The bar code would then be replaced on the mold face before being used to make another lens. The bar code transferred to the lens would be positioned at a location that would be cut away when used in glasses. Also, the back surface 54 of the rear mold 50 itself can be etched with an indication that corresponds to the information in the bar code to be reprinted onto the forward surface 52.

Since in this embodiment the computer subsystem does not know in advance which of a plurality of rear molds 50 is used for a given lens power, the computer subsystem would be required to store and use an enormous lookup table incorporating the different characteristics of every specific mold. If the system uses, for example, a thousand molds, it may be simpler to view each rear mold 50 with the camera 149 or acquire the information from a bar code. Thus, the height of the rear mold 50 is ascertained in this embodiment for the respective rear mold 50 and the ascertained height is used later to calculate the desired axial separation distance between molds 40, 50 to obtain a lens having the correct thickness. That is, the ascertained height of the rear mold 50 is used to calculate the distance that the molds 40, 50 are axially moved within the bore 30 of the gasket 20.

Continuing with the assembly process, the rear mold 50 is reinserted to be disposed adjacent the second end 24 of gasket 20, as opposed to being inserted to a calculated desired axial separation distance. Venting the cavity 31, which is the volume formed by the two molds 40, 50 and bore 30, is not necessary because of the short distance that the rear mold 50 is inserted into the bore 30. As described in more detail below, the filling station 200 preferably includes a means for axially moving the rear mold 50 within the bore 30 to the desired axial separation distance from the front mold 40. Thus, the axial separation distance between the front and rear molds 40, 50 is not important at the assembly station 110.

In one alternative embodiment, however, it is contemplated to insert the rear mold 50 into the bore 30 to the desired axial separation distance from the front mold 40 using the rear mold inserting means. Although not required, using a needle or other means to vent the cavity 31 during the adjustment in this alternative embodiment would be desirable to ensure that the molds 40, 50 are not misaligned relative to the interior surface 32 of the bore 30 when moving toward each other.

The last collet of the assembly station 110 is the clamp positioning collet 150. A means for securing the molds 40, 50 within the bore 30 is stored on the clamp positioning collet 150. The clamp positioning collet 150 has a circular indention therein sized to receive the gasket 20. The securing means for the lens-forming assembly 10 can, optionally, be added at this location. The securing means can be used to hold each mold stationary relative to each other within the bore 30 of the gasket 20. Thus, after the molds 40, 50 are axially moved to be separated from each other the desired distance at the filling station 200, the securing means firmly holds the molds 40, 50 so that their relative positions do not change. Accordingly, the securing means in the preferred embodiment is disposed around the outer surface 26 of the gasket 20 at the clamp positioning collet 150 and fully tightened at the filling station 200.

Referring to FIG. 9, the preferred embodiment of the securing means is a radial clamp 152 that maintains the position of the molds 40, 50 by circumscribing and tightening about the outer surface 26 of the gasket 20. The preferred radial clamp 152 has a belt portion 156 and a cam lock 158 used to tighten the belt. The tightened belt presses the body portion of the gasket 20 inwardly to ensure that the molds 40, 50 do not change their relative position and to enhance the seals that the gasket 20 forms with the molds 40, 50. However, the frictional force of the gasket 20 with the molds 40, 50 does not preclude a mold (e.g., the rear mold 50 in the step gasket embodiment) from sliding toward the other mold as the monomer contracts during curing. Another advantage of the radial clamp 152 is that it can also provide a handle member 154, such as the cam or other protrusion, for the robotic arm 160 or operator to grasp when handling the lens-forming assembly 10.

When aligning the components at the assembly station 110, the robotic arm 160 moves the gasket 20 with the two molds 40, 50 in its bore 30 from the rear mold/gasket positioning collet 130 to the clamp positioning collet 150. The robotic arm 160 also twists the gasket 20, if necessary, before inserting the lens-forming assembly 10 into the radial clamp 152 at the clamp positioning collet 150. If, for example, the gasket 20 is twisted when the rear mold 50 is in the retracted position, then the robotic arm 160 rotates the gasket 20 while moving it to the clamp positioning collet 150 so that the gasket 20 is in the predetermined orientation. This rotation occurs so that the ports 38, 39 of the gasket 20 are at the correct location for inserting the injection needle 252 and vent needle 232 at the filling station 200 and the flat top will be oriented substantially upright when positioned at the filling station 200 to prevent catching bubbles. If the flat top is not properly oriented, it has a tendency to trap air bubbles along its edge because of the high-energy area existing from the surface tension at its edge.

Also, the radial clamp 152 can include a plurality of apertures (not shown) therethrough, in which one aperture aligns with a respective port 38, 39 of the gasket 20. The injection needle 252 is inserted through one aperture and the vent needle 232 is inserted through the other aperture so that both needles 232, 252 communicate with respective ports 38, 39 of the gasket 20.

An alternative embodiment of the present invention does not use a securing means. The gasket, however, should be thicker and the molds should fit tighter within the gasket to ensure no leakage occurs. This alternative embodiment is presently less desirable based on the automated process used.

B. The Filling Station

Figure 11:
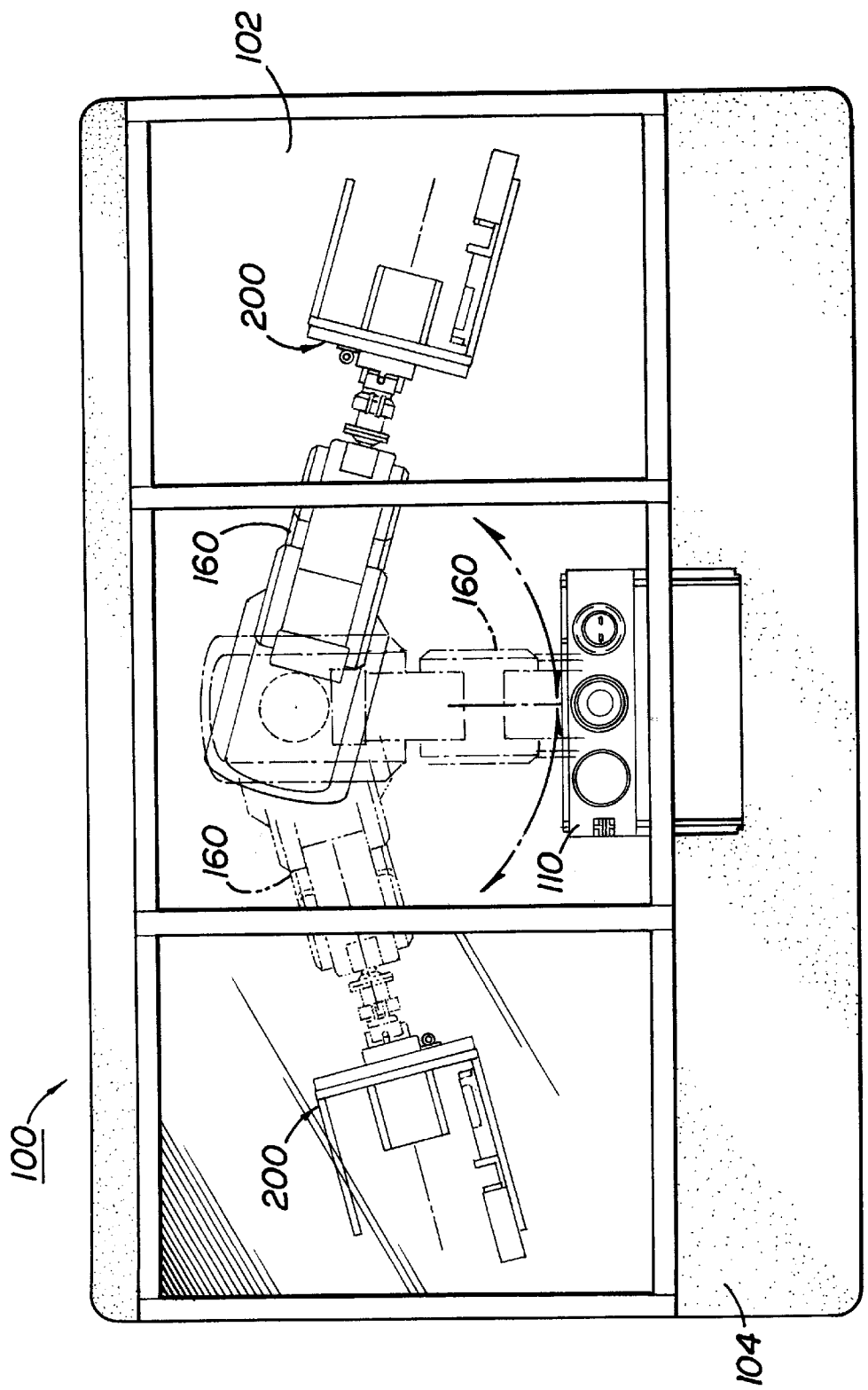
FIG. 11 is a top plan view of the system showing the robotic arm moved to one filling station and, in phantom, the robotic arm picking up the gasket and radial clamp from the assembly station and also moving to another filling station.

After assembling the gasket 20, molds 40, 50, and the radial clamp 152 at the assembly station 110, the robotic arm 160 transfers the formed lens assembly to the filling station 200, which is shown in FIG. 11. The robotic arm 160 operating at the assembly station 110 is shown in phantom. Also the robotic arm moving to another filling station 200 is also shown in phantom.

Figure 12:
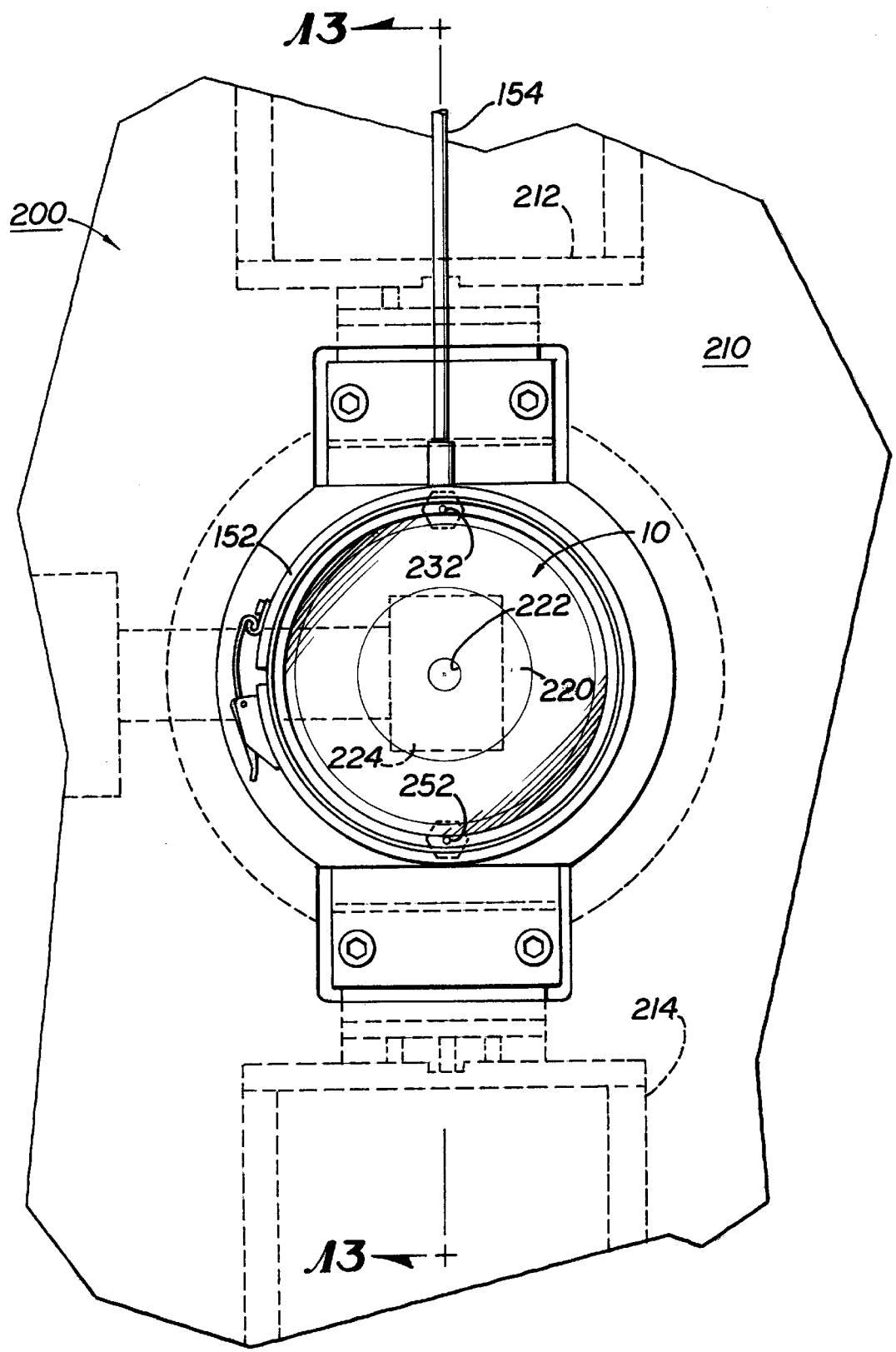
FIG. 12 is a front view of the filling station.
Figure 13:
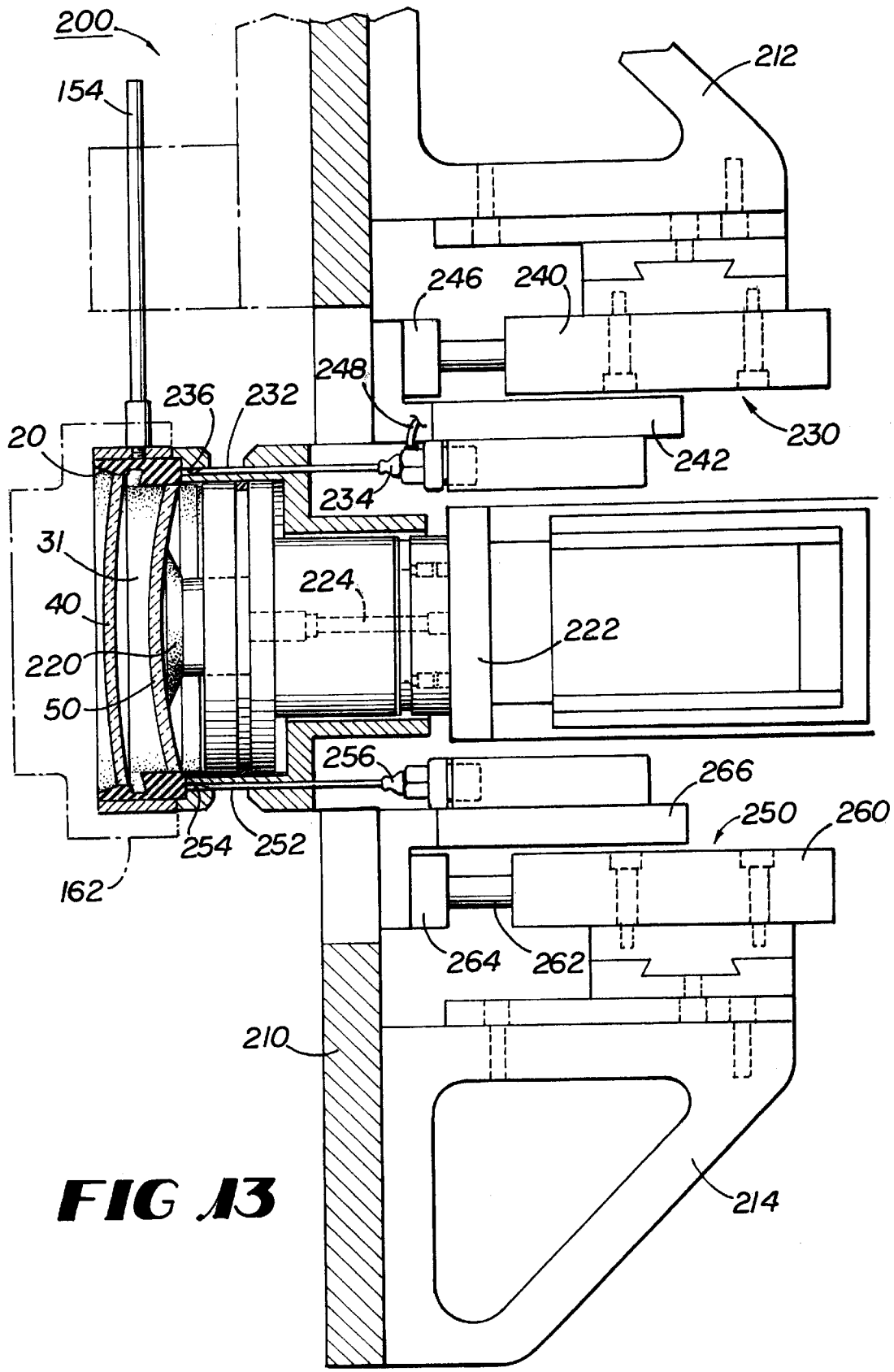
FIG. 13 is a side cross-sectional view of the filling station taken along line 13—13 in FIG. 12 when the lens-forming assembly first arrives.
Figure 14:
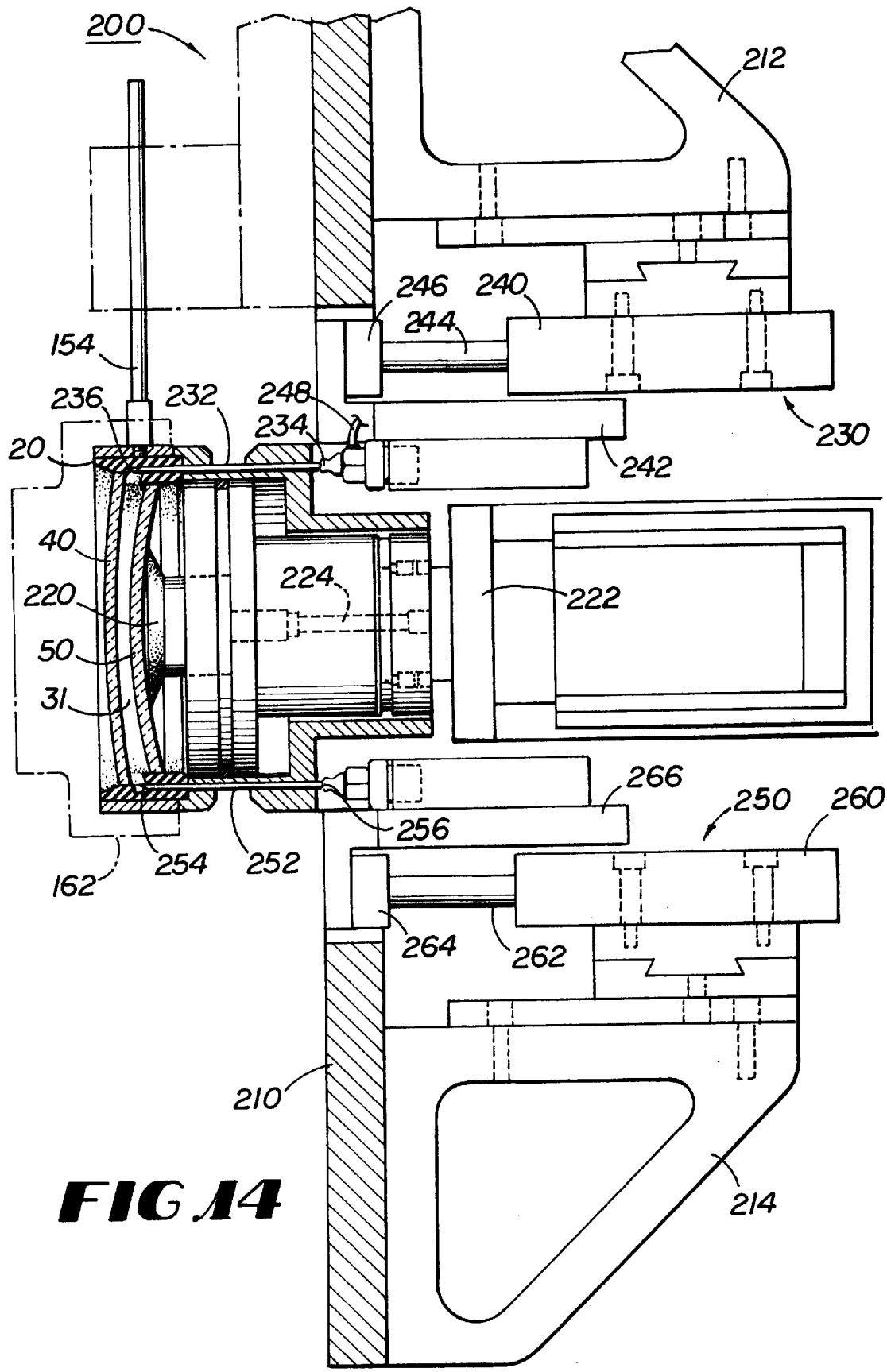
FIG. 14 is a side cross-sectional view of the filling station shown in FIG. 13 when the filling starts, in which the needles are inserted into the gasket and the linear actuator has moved the rear mold to the correct axial separation distance from the front mold.

Now referring to FIGS. 12–14, the filling station 200 preferably comprises a means for supporting the lens-forming structure 10 and a means for axially moving the rear mold 50 relative to the front mold 40 to a desired one of a plurality of axial separation distances between the molds 40, 50 (e.g., the rear mold 50 is moved in the step gasket embodiment). The front mold 40 could alternatively be moved if the straight-walled gasket was used instead of the step gasket.

The filling station 200 has an upright support plate 210 supporting a top bracket 212 and a bottom bracket 214. The top bracket 212 supports the vent assembly 230 and the bottom bracket 214 supports the fill assembly 250.

The axial moving means preferably comprises a cylindrical piston 220 having an end adapted to engage the mold to be slid within the bore 30. A linear actuator 222, or servo motor, which generates an output, is disposed on the base of the frame and includes a ball screw (not shown) upon which a slide (not shown) traverses or rides. A means for mechanically coupling the linear actuator 222 to the piston 220, specifically a coupler 224, translates the output of the linear actuator 222 into movement of the piston 220. The piston 220 axially moves the rear mold 50 disposed within the bore 30 of the gasket 20 relative to the front mold 40. FIG. 13 shows the rear mold 50 before it is pushed along the bore 30 of the gasket 20 and FIG. 14 shows the cylindrical piston 220 having pushed the rear mold 50 toward the front mold 40 so that the desired separation distance exists therebetween and the cavity 31 is the desired dimension. Electric or pneumatic power is used to operate the linear actuator 222.

In one embodiment, the piston 220 pushes the rear mold 50 further into the bore 30 toward the front mold 40, as opposed to pulling the rear mold 50. That is, the separation between the front mold 40 and rear mold 50 when assembled at the assembly station 110 is such that pushing is the only action that the piston 220 performs on the rear mold 50 to form the lens. However, a vacuum line (not shown), which is connected to a vacuum source (not shown), can extend through the piston 220 so that a vacuum or suction can be exerted on the back surface 54 of the rear mold 50 to push or pull the rear mold 50. The vacuum line can also ensure that the piston 220 securely engages the rear mold 50 as the piston 220 pushes the rear mold 50 so that the mold does not tilt, which would cause the lens to be improperly formed or the injected monomer to leak past the rear mold 50.

The filling station 200 also comprises a means for providing fluid communication between the bore 30 intermediate the front and rear molds 40, 50, or the cavity 31, and outside the outer surface 26 of the gasket 20. Additionally, the filling station 200 comprises a means for injecting a desired amount of a lens-forming fluid into the cavity 31. The providing means is also known as the vent assembly 230 and the injecting means is known as the fill assembly 250. The vent assembly 230 and fill assembly 250 are structurally and operationally similar.

The vent assembly 230 comprises a vent needle 232 that has a base end 234 and a tip end 236, which is adapted to penetrate through a portion of the gasket 20. The tip end 236 of the vent needle 232 is in fluid communication with the base end 234 to allow a fluid, such as air, to flow therebetween.

The vent assembly 230 also comprises a means for shifting the vent needle 232 between a first position and a second position. In the first position shown in FIG. 14, the tip end 236 of the vent needle 232 is in fluid communication with the cavity 31 and, in the second position shown in FIG. 13, the tip end 236 is spaced apart from the gasket 20 and its bore 30. The shifting means preferably is a pneumatic cylinder 240 that drives a syringe piston 244, which is in contact with a coupler block 246. A syringe support block 242 holds the vent needle 232 and is fixedly attached to the coupler block 246. Thus, the syringe support block 242 and vent needle 232 move in response to the syringe piston 244. A protective cover (not shown) optionally shields the tip of the vent needle 232 when the vent needle 232 is in the second position.

The injection means, or fill assembly 250, includes an injection needle 252 having a insertion end 254 that penetrates through a portion of the gasket 20 to be in fluid communication with the cavity 31, a receiving end 256 adapted to be in fluid communication with a supply of the lens-forming fluid, and a passage (not shown) extending therebetween. The passage allows the lens-forming fluid to traverse from the receiving end 256, through the passage, out of the insertion end 254 and into the cavity 31.

The fill assembly also includes a means for conveying the injection needle 252 between an insert position shown in FIG. 14, in which the insertion end 254 of the injection needle 252 is in fluid communication with the cavity 31, and a withdrawn position. In the withdrawn position shown in FIG. 13, the insertion end 254 is spaced apart from the gasket 20. The conveying means of the fill assembly, similar to the vent assembly 230, includes a pneumatic cylinder 260, a syringe piston 262, a coupler block 264, and a syringe support block 266. The injection needle 252 is connected to a fill conduit (not shown) in fluid communication with a fill line. A protective cover (not shown) also optionally shields the tip of the injection needle 252 when in the withdrawn position.

The robotic arm 160, as discussed above, moves the lens-forming structure 10 to the filling station 200 and positions it on the supporting means of the filling station 200. The vent needle 232 is moved to the first position, in which the needle 232 is inserted into the gasket 20 to communicate with the cavity 31 via one port 39 of the gasket 20. The vent needle 232 thus allows air to escape from the cavity 31 so that when one mold is slid relative to the other mold by the piston 220 of the axial moving means, atmospheric pressure exists therebetween.

The computer subsystem marks in its coordinate system where the front mold 40 is located, which is adjacent the step 36 in the gasket 20. The cylindrical piston 220, which is attached to the linear actuator 222, slides the rear mold 50 to obtain the correct thickness of the desired lens to be formed. As discussed above, the computer subsystem has ascertained the actual height of the rear mold 50 from the image recorded by the camera 149 at the assembly station 110, from bar code data, or from other means. Thus, the computer subsystem directs the rear mold 50 to be pushed toward the front mold 40 a predetermined distance to form a lens having the desired thickness, in which the computer subsystem uses the height of the specific rear mold 50 ascertained earlier in the process. If desired for increased precision, the computer subsystem can adjust the axial separation distance to account for shrinkage (approximately ten to fifteen percent by volume) that will occur when the monomer is cured. After axially moving the rear mold 50, the front and rear molds 40, 50 are at the correct rotational orientation relative to each other and are separated from each other at the desired axial distance.

The next step in the process is injecting the lens-forming fluid, namely, the liquid monomer, into the cavity 31. The vent needle 232 already communicates with the cavity 31, preferably at its highest point, and the injection needle 252 is inserted into the other ports 38 to be in communication with the cavity 31. The monomer is then supplied through the injection needle 252 into the cavity 31. The present invention allows effective venting and filling of the cavity 31, regardless of the separation of the front and the rear molds 40, 50 and the quantity of monomer to be injected.

As shown in FIGS. 13 and 14, the gasket 20 is positioned with the injection port 38 disposed below the vent port 39 so that any air bubbles that may form as the monomer is injected into the cavity 31 are effectively displaced and vented. However, the fill or injection rate used is slow enough so that no bubbles form.

The filling station 200 includes a means for detecting a level of the monomer added by the injecting means. The detecting means preferably comprises a means, in fluid communication with the vent needle 232, for creating a sub-atmospheric pressure in either locally in the tip end 236 of the needle 232 or in the cavity 31 and a means, also in fluid communication with the vent needle 232, for sensing pressure in the volume. The vent needle 232 is connected to a vacuum source (not shown) by a first line 248 that draws air through a vent in the needle 232 about one-half an inch from the tip end 236, thereby lowering the pressure in the tip end 236 or the cavity 31 to a pressure less than atmospheric, e.g., pulling a slight vacuum. For ease of illustration, the first line 248 is shown closer to the base end 234 of the needle 232 than in the preferred design. A second line (not shown), which senses the vacuum, is connected to a vacuum sensor (not shown).

When the liquid monomer fills the cavity 31 and reaches the vent needle 232, which is located at the highest position in the cavity 31, the vacuum sensor detects the pressure increase, e.g., the vacuum lowers, which triggers the computer subsystem to turn off the monomer fill. As one skilled in the art will appreciate, the quantity of monomer wasted is a few micrograms, e.g., that amount required to fill the small portion of the needle 232. In comparison, the monomer wasted in the prior art systems is orders of magnitude larger.

The vacuum used can be slightly below atmospheric pressure. A lower pressure is not necessary since the primary purpose of that vacuum is to function as the fill sensor, not to assist in the filling. That is, if the vacuum exists in the cavity 31 that may be beneficial during filling by further reducing the chance of forming bubbles, the advantages are not significant compared to venting the cavity 31 to atmosphere.

As one skilled in the art will appreciate, other sensors can be used to detect when the gasket 20 is filled with monomer, such as an electronic eye (not shown), other optic sensors (not shown), and the like.

An alternative method of performing the filling process is for the computer subsystem to calculate the volume of monomer to inject into the cavity 31 and stop filling the cavity 31 once the calculated volume has been added. Accordingly, the use of sensors in this alternative filling method is optional. It is also contemplated that the predetermined amount of monomer to be injected before the molds 40, 50 are axially moved toward each other so that the cavity 31 will be completely filled when the molds 40, 50 are at the desired axial separation distance.

The location at which the vent and injection needles 232, 252 enters the gasket 20 can vary. In the preferred embodiment, the needles 232, 252 move axially through a portion of the gasket 20 until the respective tip is in fluid communication with a port 38, 39. The port is also in fluid communication with the cavity 31. This design is preferred to an alternative embodiment in which the respective needles 232, 252 traverse through the gasket 20 perpendicular to the outer surface 26 so that the tip of the needle physically enters into the cavity 31. Inserting a portion of either the vent needle 232 or the injection needle 252 can cause problems in this alternative embodiment if the front mold 40 and rear mold 50 are axially separated by a small distance when forming a low-power lens. Also, a mold having the annular ring 60 shown in FIG. 4 can be used for a small separation distance.

After completing the filling, the needles 232, 252 are then retracted and the gasket 20 is sealed by the sealing means, preferably by the material of the gasket self-sealing. The radial clamp 152 of the securing means can then be tightened, securing the molds 40, 50 in the bore 30 at the desired distance from each other. As one skilled in the art will appreciate, the radial clamp 152 could alternatively be tightened after the axial moving means positions the rear mold 50 at the correct location relative to the front mold 40 and before the monomer is injected.

The present invention can use multiple filling stations 200 and assembly stations 110. For example, one embodiment uses two assembly stations and two filling stations operating simultaneously. A single robotic arm assembles one lens-forming assembly while another lens-forming assembly is injected with monomer at the filling station. The robotic arm then transfers the newly assembled lens-forming structure to the other filling station for filling, removes the lens-forming assembly into which monomer was injected, and then assembles the next lens-forming assembly. The process would continue to repeat. Another contemplated embodiment has four stations and two robotic arms, in which one robotic arm is used for assembling and loading lens-forming assemblies onto the filling stations and another for unloading the filling stations. As one skilled in the art will appreciate, other variations in the number of robotic arms and filling stations can be used.

THE CURING METHOD

The robotic arm 160 removes the lens-forming assembly 10 injected with monomer from the filling station 200 and delivers it to the operator or another automated system for curing the monomer. The curing method of the present invention involves exposing the monomer to an ultraviolet ("UV") light for a desired time, which is significantly less than the prior art. The UV light exposure is the only step in the preferred embodiment. Alternatively, after exposing the monomer to UV light, the monomer is then heated for a predetermined time, such as in an infra-red ("IR") oven. The second, heating step solidifies the monomer to form the hardened polymeric lens if not sufficiently cured in the UV step.

The desired exposure time to the UV light is between twenty (20) seconds and thirty (30) minutes, more preferably between thirty (30) seconds and two (2) minutes, and most preferably between forty-five (45) seconds and one and a half (1½) minutes. The exposing step occurs by placing the monomer between a plurality of UV light sources, preferably one adjacent to each end of the gasket 20 so that the UV light passes through the glass molds to the monomer into the cavity 31. The intensity of the UV light sources 312 is preferably about $1.2–1.3 \times 10^{-2}$ watts per square centimeter at a wavelength of 350 nanometers.

Figure 15:
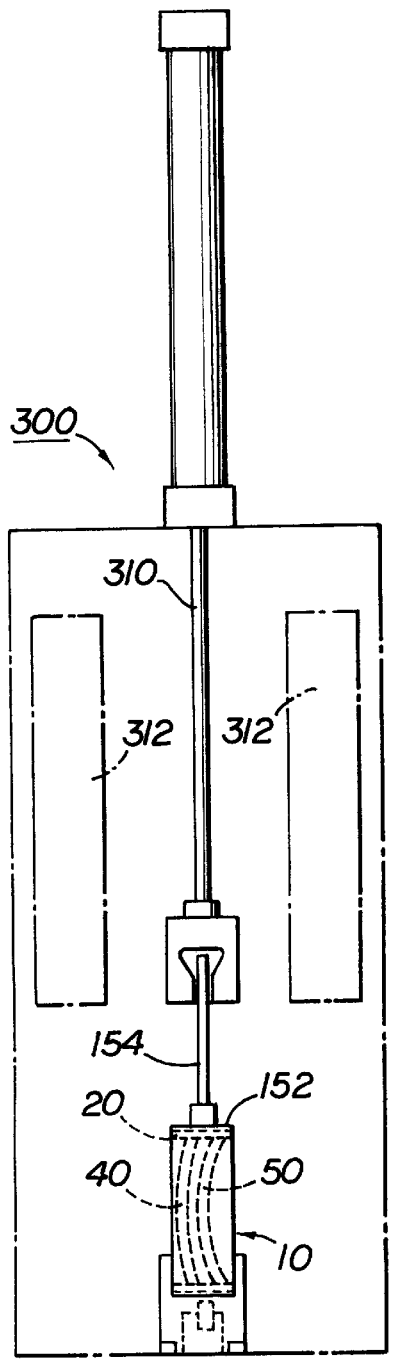
FIG. 15 is a simplified cross-sectional view partially in schematic of a UV curing device to cure the lens formed at the assembly and filling stations.

The process of exposing the lens-forming assembly 10 can be automated by, for example, using the curing station 300 in FIG. 15. The operator connects the handle member 154 of the clamp 152 to a movable cylinder rod 310, which moves the clamp 152 and lens-forming assembly 10 upwardly. At the top position, the two molds 40, 50 are each exposed to a UV light source 312 so that the UV light passes therethrough to interact with the monomer. The computer subsystem or other automated or manual means energizes the UV light sources 312 for a desired period, after which time the movable cylinder rod 310 lowers so that the operator can remove the clamp 152 and lens-forming assembly 10.

The curing method of the present invention is quicker, less complex, and more efficient than the prior art processes because at the unique gasket design. The curing method completely cures the monomer and reduces the stresses in the cured monomer so that the cured lens is stronger than a lens cured using prior art processes. Stresses are also reduced because the rear mold 50 slides along the bore 30 of the gasket 20 when the monomer volume shrinks by approximately ten to fifteen percent when cured. The molds in the prior art T-gasket, in contrast, remain stationary, regardless of the stresses from shrinkage.

THE SEPARATING APPARATUS AND METHOD

After the liquid monomer has been cured, the solidified lens must be separated from the gasket 20 and molds 40, 50. Since the gasket 20 is flexible, the two molds 40, 50 and the lens sandwiched therebetween can easily be slid out of the gasket 20 after the radial clamp 152 is removed. However, separating the molds 40, 50 from the lens is more difficult because a strong bond is created by the surface tension between the lens and contacting mold surfaces. The present invention, thus, also includes an apparatus and method for separating the molds 40, 50 from the newly formed lens.

Figure 16:
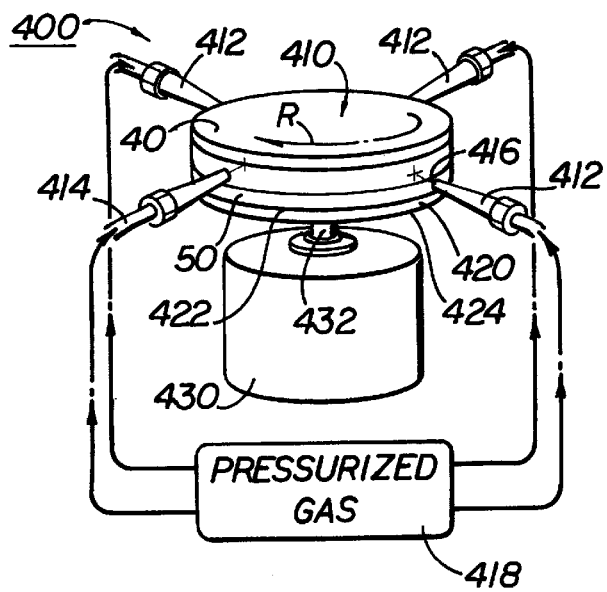
FIG. 16 is a perspective of the separating device, partially in schematic, of the present invention used to separate the molds from the cured lens.

Referring now to FIG. 16, the separating device 400 of the present invention comprises a means for supporting the lens and molds and a means for directing a fluid onto a portion of at least one of the lens or mold. As one skilled in the art will appreciate, the lens and mold have a different coefficient of thermal expansion because they are formed of different materials. The fluid, preferably a gas, has a temperature which is lower than the temperature of both the mold and the lens, which have recently been removed from the heat source, i.e., the UV light or the IR oven. The temperature of the gas is usually less than ambient temperature and the temperature of the lens and mold is greater than ambient.

Examples of gases that can be used include pressurized air, oxygen, nitrogen, and, most preferably, carbon dioxide ("$CO_2$"). The gas, directed by the directing means, cools the warmer mold-lens-mold sandwich 410 causing the glass molds and cured monomer to contract. Since the coefficients of thermal expansion are different for the glass and polymer lens being cooled, a differential shrinkage rate exists for the two materials. This different contraction rate assists in breaking the surface bond between the molds 40, 50 and the respective surfaces of the lens. As one skilled in the art will appreciate, the greater the temperature differential between the gas and the mold-lens-mold sandwich 410, the more rapid the cooling and the more effectively the lens is separated from the molds 40, 50.

The directing means comprises a nozzle 412 connected to a supply 418 of the gas at a pressure greater than atmospheric pressure. The nozzle 412 has an inlet 414 in fluid communication with the supply 418 of the gas and an outlet 416 that directs the gas toward the lens and the mold, specifically at the interface of the lens and one mold. As an example, each nozzle 412 can have an internal diameter of approximately three (3) millimeters that reduces to approximately three tenths (0.3) of a millimeter at the outlet 416. Such a nozzle 412 allows the fluid exiting therefrom to increase to a high velocity. The directing means encompasses one nozzle 412, more preferably two nozzles, and most preferably four nozzles which are each disposed approximately every 90° around the edges of the mold-lens-mold sandwich 410. FIG. 16 shows an embodiment with four nozzles 412.

The supporting means comprises a horizontally disposed member 420 having an upper surface 422 adapted to support the lens and mold thereon and an opposite lower surface 424. The preferred supporting means also has an axis of rotation R. The present invention further comprises a means for moving a selected one of the supporting means or the nozzles 412 of the directing means relative to the other. As one skilled in the art will appreciate, the nozzles 412 can rotate relative to the mold-lens-mold sandwich 410, the nozzles 412 and the sandwich 410 can rotate opposite directions, or both the nozzles 412 and the sandwich 410 can rotate the same direction at different speeds so that relative motion exists therebetween. It is also contemplated that no relative motion exists between the directing means and the supporting means.

In the preferred embodiment, however, the supporting means rotates about its axis of rotation R while the nozzles 412 remain stationary so that the mold-lens-mold sandwich 410 spins relative to the nozzles 412. The means for rotating the member 420 preferably comprises a motor 430 generating a rotational output and a segment 432 having opposed ends. One end of the segment 432 is connected to the motor 430 and the other end of the segment is connected to a portion of the lower surface 424 of the member 420 so that the output of the motor 430 rotates the member 420 about its axis of rotation R. The motor 430 can be powered by electricity, pressurized air, or other means known in the art.

Still referring to FIG. 16, the outlet 416 of each nozzle 412 is preferably disposed at a different height relative to the other nozzles 412 because at least one outlet 416 of one nozzle 412 should be directed at the interface of the lens and an adjacent mold, regardless of the thickness of the lens. That is, each nozzle 412 directs the gas to a different height on the edges of the mold-lens-mold sandwich 410 to cool the materials. The rotating means, in conjunction, creates relative spinning motion between the mold-lens-mold sandwich 410 and the nozzles 412. Directing the gas at the interface of the lens and the mold is assisted since the gas expands and spreads out after leaving the outlet 416 of the nozzle 412 to cover a vertical height of approximately one millimeter or more, depending factors such as gas velocity, nozzle design, and the separation distance between the outlet 416 of the nozzle 412 and the mold-lens-mold sandwich 410.

When high-velocity carbon dioxide, the preferred gas, is directed from the nozzle 412 at the interface of the lens and one of the molds 40, 50, some of the gas molecules reach the interface therebetween. It is believed that some of the carbon dioxide turns into "dry ice" when reaching the lens-mold-lens sandwich 410 and expands after penetrating a space existing between the lens and one mold. The expansion forces the adjacent lens and mold away from each other, assisting in breaking the proximity contact of the components. The penetrating carbon dioxide additionally cools the lens and mold at their interface to accelerate the differential shrinkage therebetween. And, the more separation that occurs, the deeper the carbon dioxide can penetrate to continue the expansion and the cooling. This apparatus and method of the present invention can cause the mold and lens to separate without any external physical or mechanical shear stresses placed on the components.

The present invention, however, can also comprises a means for physically bending a portion of a selected one of the lens or the mold. The preferred bending means comprises at least two engaging members (not shown), each engaging member having a contacting surface adapted to detachably engage a separate portion of the lens, and a means for moving the engaging members relative to each other so that the respective contacting surfaces cause the lens to bend. The contacting surface can be formed as dull teeth, a knurled surface, or other pattern that prevents slippage between the engaging member and the edge of the lens.

The moving means comprises at least one actuator which generates an output, a means for mechanically coupling each linear actuator to one respective engaging member, and a means for energizing the actuator. The output of the actuator translates into movement of the coupled engaging member. Thus, the contacting surface of the engaging member squeezes inwardly against the plastic of the lens to deform it away from the glass mold, thereby causing slight physical deformation to break the surface tension bond therebetween. The opposed edge of the lens can be placed against either a stationary engaging member or another engaging member coupled to a separate actuator, in which the two actuators move their respective engaging members toward each other. It is less desired to deform physically the lens as compared to using the cool gas to separate the components.

Still another means to separate the lens from the mold is the operator submerging the components into soapy water. This alternative allows simultaneously cleaning and separating the lens and molds.

Figure 17A:
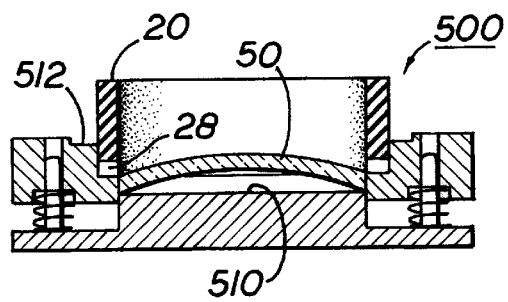
FIG. 17A is a cross-sectional view of the assembly fixture that shows the gasket aligned to receive the rear mold into its bore.
Figure 17B:
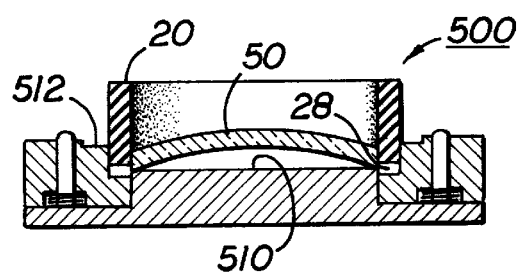
FIG. 17B is a cross-sectional view of FIG. 17A, in which the rear mold is inserted into the gasket using the assembly station.

After the molds 40, 50 have been separated from the cured lens, the molds 40, 50 and gasket 20 can be reused or discarded. If the components are to be reused, the operator places the rear mold 50 into the bore 30 of the gasket 20 at a predetermined rotational orientation relative to the gasket 20. The operator can use an assembly fixture 500, which is shown in FIGS. 17A and 17B, to aid in inserting the rear mold 50 into the bore 30 and to reduce the physically handling of the rear mold 50.

The gasket 20 can be used again to make another lens if it is in an acceptable condition. However, the life of the gasket 20 is much shorter than that of the glass molds. If the gasket 20 requires extensive cleaning or has been damaged, the gasket 20 is discarded and later ground to be recycled.

The assembly fixture 500 has a center portion 510 adapted to support horizontally the back side of the rear mold 50. Surrounding the center portion 510 of the assembly fixture 500 is a spring-loaded receiver 512 adapted to engage the second end 24 of the gasket 20. Thus, the center portion 510 holds the rear mold 50 and the gasket 20 is pushed downwardly against the spring-loaded receiver 512 so that the rear mold 50 is accepted into the bore 30 of the gasket 20.

The rear mold 50 is marked, for example, by a line etched on the surface that does not contact the monomer when forming the lens, e.g., the back surface 54. The operator aligns the rear mold 50 at a desired rotational orientation relative to the aligning apparatus. The rotational orientation of a toric back lens relative to the gasket 20 must be at a known position for orienting at the assembly station 110. The operator then positions the gasket 20 above the assembly fixture 500 and rotationally orients a marking on the gasket 20 to be in registry with the etched line on the rear mold 50. In the preferred embodiment, the gasket 20 will only be accepted by the assembly fixture 500 when the gasket 20 is at a desired rotational orientation, thus helping to ensure that the gasket 20 and the rear mold 50 are at the desired rotational orientation relative to each other. The key notch 28 can be used to ensure that the gasket 20 is properly aligned with the spring loaded receiver 512. FIG. 17A shows the components properly aligned.

FIG. 17B shows that the operator has pushed the gasket 20 downwardly on the assembly fixture 500 so that the rear mold 50 is received within a portion of the bore 30. When the operator starts to push downwardly, the gasket 20 moves against the spring force and receives the rear mold 50 into its bore 30. When the rear mold 50 is axially received a predetermined distance within the bore 30, movement of the gasket 20 is stopped by the receiver 512, which cannot be compressed further. The rear mold 50, accordingly, is placed into the bore 30 at a desired distance.

Although the axial position of the rear mold 50 within the bore 30 is not critical, the assembly device nevertheless ensures that the rear mold 50 is consistently positioned the same distance each time, instead of the variations occurring among different operators. This improves the operation of the present invention by, for example, ensuring that the rear mold 50 is not inserted too far within the bore 30 to hinder operation of the mold support plate 136 moving the rear mold 50 to the retracted position at the assembly station 110. As one skilled in the art will appreciate, this process can be automated so that a robotic arm or the like performs the process of placing the rear mold 50 in the bore 30 of the gasket 20 at a known rotational orientation.

From a handling perspective, it is also easier to store the rear mold 50 in the gasket 20. Since the surface 44, 52 of the mold used to form the lens is an active surface, contaminants, such as those on a person's fingers, can ruin it. But touching the other surface 42, 54 of the mold 40, 50, which is not used to form the shape of the lens, is not a problem. For the rear mold 50, the forward surface 52, which is oriented to face the interior of the gasket 20, is the active surface and the back surface 54, which is handled, does not present a problem. It is easier to place the rear mold 50 in the bore 30 so that the active side is protected by the gasket 20 and handle the front mold 40 by the forward surface 42, e.g., the robotic arm 160 contacts the forward surface 52.

The front mold 40 and the gasket/rear mold 20, 50 then are moved to the appropriate storage area near the assembly station 110 to form additional lenses. The operator, for example, places the components on a moving belt. The front mold 40, which can be stored in a carrier, is placed on one belt and the gasket/rear mold 20, 50 on another belt. Sensors detect that the molds reached the end of the belt and, if necessary, stop the movement of the respective belt. Another operator at the end of the belt then places the components at the correct storage location so that the process of the present invention can be repeated.

Although the present invention has been described with reference to specific details of certain embodiments thereof, it is not intended that such details should be regarded as limitations upon the scope of the invention except as and to the extent that they are included in the accompanying claims.

What is claimed is:

1. A method for curing a lens-forming fluid, comprising the steps of:
   a. placing the lens-forming fluid in a molding cavity from a supply of the lens-forming fluid, the molding cavity being defined by a front mold, a rear mold and a gasket, wherein the gasket has a first end and a second end, a body portion joining the first end and the second end and having an outer surface, a bore extending axially through the body portion for receiving the front mold and the rear mold, the bore having a longitudinal axis, and at least one port formed intermediate the outer surface of the body portion and the bore, the port being separated from the ambient air by the outer surface of the body portion and being in fluid communication with the molding cavity, and wherein the lens-forming fluid from the supply of the lens-forming fluid is placed into the molding cavity through the port;
   b. terminating fluid communication between the supply of the lens-forming fluid and the port; and
   c. exposing the lens-forming fluid to an ultra-violet light for a desired time, thereby curing the lens-forming fluid.

2. The method of claim 1, wherein the desired exposure time is between thirty seconds and two minutes.

3. The method of claim 1, wherein the desired exposure time is between forty-five seconds and ninety seconds.

4. The method of claim 1, wherein the desired exposure time is between twenty seconds and thirty minutes.

5. The method of claim 1, wherein the lens-forming fluid is a monomer.

6. The method of claim 1, wherein the exposing step occurs by placing the lens-forming fluid intermediate a plurality of ultraviolet light sources.

7. The method of claim 1, wherein the intensity of the ultra-violet light is at least $1.2 \times 10^{-2}$ watts per square centimeter at a wavelength of 350 nanometers.

8. A method for curing a lens-forming fluid placed, comprising the steps of:
   a. placing the lens-forming fluid in a molding cavity from a supply of the lens-forming fluid, the molding cavity being defined by a front mold, a rear mold and a gasket, wherein the gasket has a first end and a second end, a body portion joining the first end and the second end and having an outer surface, a bore extending axially through the body portion for receiving the front mold and the rear mold, the bore having a longitudinal axis, and at least one port formed intermediate the outer surface of the body portion and the bore, the port being separated from the ambient air by the outer surface of the body portion and being in fluid communication with the molding cavity, and wherein the lens-forming fluid from the supply of the lens-forming fluid is placed into the molding cavity through the port;
   b. exposing the lens-forming fluid to an ultra-violet light to cure the lens-forming fluid, wherein the exposure time is between twenty seconds and thirty minutes; and
   c. subsequent to the exposing step, heating the cured lens-forming fluid to further solidify the cured lens-forming fluid.

9. The method of claim 8, wherein the desired exposure time is between thirty seconds and two minutes.

10. The method of claim 8, wherein the desired exposure time is between forty-five seconds and ninety seconds.

11. The method of claim 8, wherein the heat in the solidifying step is generated by infra-red heat generator.

12. The method of claim 8, wherein the lens-forming fluid is a monomer.

13. The method of claim 8, wherein the increasing step occurs by placing the lens-forming fluid intermediate a plurality of ultraviolet light sources.

14. The method of claim 8, wherein the intensity of the ultra-violet light is at least $1.2 \times 10^{-2}$ watts per square centimeter at a wavelength of 350 nanometers.

* * * * *